US011696586B1

(12) United States Patent
Romero et al.

(10) Patent No.: US 11,696,586 B1
(45) Date of Patent: Jul. 11, 2023

(54) STARCH-FREE BAKED FOODS AND METHODS OF MAKING

(71) Applicant: Simply Good Foods USA, Inc., Denver, CO (US)

(72) Inventors: Marc Anthony Romero, Torrance, CA (US); Zachary Zopf Kazarian, Los Angeles, CA (US)

(73) Assignee: Simply Good Foods USA, Inc., Denver, CO (US)

( * ) Notice: Subject to any disclaimer, the term of this patent is extended or adjusted under 35 U.S.C. 154(b) by 0 days.

(21) Appl. No.: 17/586,981

(22) Filed: Jan. 28, 2022

(51) Int. Cl.
| | | |
|---|---|---|
| *A21D 13/062* | (2017.01) | |
| *A21D 10/04* | (2006.01) | |
| *A23J 1/20* | (2006.01) | |
| *A21D 2/18* | (2006.01) | |
| *A21D 2/26* | (2006.01) | |

(52) U.S. Cl.
CPC ........... *A21D 13/062* (2013.01); *A21D 2/181* (2013.01); *A21D 2/185* (2013.01); *A21D 2/263* (2013.01); *A21D 10/04* (2013.01); *A23J 1/202* (2013.01); *A23J 1/205* (2013.01)

(58) Field of Classification Search
None
See application file for complete search history.

(56) References Cited

U.S. PATENT DOCUMENTS

| | | | |
|---|---|---|---|
| 4,042,714 | A | 8/1977 | Torres |
| 4,379,782 | A | 4/1983 | Staub et al. |
| 6,558,731 | B1 | 5/2003 | Del Valle |
| 6,749,886 | B2 | 6/2004 | Jones |
| 7,595,081 | B1 | 9/2009 | Bellar |
| 8,642,109 | B2 | 2/2014 | Baumer et al. |
| 10,357,041 | B2 | 7/2019 | Lanvin et al. |
| 2005/0129823 | A1 | 6/2005 | Dohl et al. |

(Continued)

FOREIGN PATENT DOCUMENTS

| | | |
|---|---|---|
| EP | 1340431 A1 | 9/2003 |
| EP | 1774856 B1 | 6/2009 |

(Continued)

OTHER PUBLICATIONS

Meena et al., Milk protein concentrates: opportunities and challenges, Journal of Food Science and Technology, vol. 54 (10), pp. 3010-3024, Sep. 2017.

(Continued)

*Primary Examiner* — Lien T Tran
(74) *Attorney, Agent, or Firm* — Kagan Binder, PLLC

(57) ABSTRACT

Starch-free baked comestible goods and aqueous slurries (batters) for preparation of starch-free baked comestible goods include a combination of three different protein components that are protein concentrates or protein isolates, wherein the protein components differ by solubility in water and/or particle size when suspended in an aqueous medium. The combination of three protein components, particularly in certain weight ratios, enables the preparation of starch-free baked comestible goods including doughnuts, muffins, cakes, and bars as well as other commonly recognized desirable comestible formats. The starch-free baked comestible goods have an improved texture and extended shelf-life as compared to previously developed starch-free baked comestible goods.

18 Claims, 2 Drawing Sheets

(56) References Cited

U.S. PATENT DOCUMENTS

| | | |
|---|---|---|
| 2007/0148324 A1 | 6/2007 | Lin et al. |
| 2007/0231450 A1 | 10/2007 | Coleman et al. |
| 2009/0246346 A1 | 10/2009 | Ng |
| 2010/0303997 A1* | 12/2010 | Fulton .................. A21D 2/36 |
| | | 426/601 |
| 2016/0302463 A1 | 10/2016 | Woodyer et al. |
| 2019/0343133 A1 | 11/2019 | Wareing |
| 2019/0357551 A1* | 11/2019 | Bains .................. A23L 33/195 |
| 2020/0178545 A1* | 6/2020 | Osmanoglou ......... A23L 33/185 |
| 2020/0178563 A1 | 6/2020 | Schmitt et al. |

FOREIGN PATENT DOCUMENTS

| | | |
|---|---|---|
| EP | 2545789 A1 | 1/2013 |
| EP | 1755407 B1 | 10/2013 |

OTHER PUBLICATIONS

International Search Report mailed in International Application No. PCT/US2022/014303, dated Jun. 14, 2022, 7 pages.

Written Opinion mailed in International Application No. PCT/US2022/014303, dated Jun. 14, 2022, 9 pages.

Milk protein concentrate, Wikipedia, 2011, 3 pages, retrieved from the internet on Mar. 23, 2022 from <https://en.wikipedia.org/wiki/Milk_protein_concentrate>.

Mastersizer 2000 User Manual, Malvern Instruments Ltd., Issue 1, Mar. 2007, 5 pages.

Whey protein, Wikipedia, 2004, 4 pages, retrieved from the internet on Mar. 23, 2022 from <https://en.wikipedia.org/wiki/Whey_protein>.

* cited by examiner

STARCH-FREE BAKED FOODS AND METHODS OF MAKING

FIELD OF THE INVENTION

The present invention generally relates to baked comestible articles and methods for preparation thereof.

BACKGROUND

In traditional baked foods, a stretched network of proteins, fibers and starch are associated with desirable characteristic organoleptic sensations during consumption. During the baking (heating) process, hot gases inside a dough or batter stretch the protein and fiber components, and eventually lead to discrete and/or interconnected gas (air) pockets distributed within the fibrous infrastructure of the baked food. Fat (lipids) and dough conditioners as well as moisture in the form of liquid water contribute to the elasticity of the network formed by the protein and fiber components and increase their ability to entrain gases. Starch, which is a component of flour, acts as a glue when surrounded by liquid water to connect and anchor the stretched protein and fiber strands to fortify the interlocking network. The quantity and properties of the specific mixture of proteins, fat, water, fiber and starch determine the form and characteristics of the solidified final network of strands that people associate with the structure of baked foods. Together with the size and distribution of air pockets or bubbles entrained by the solidified interlocking network, the baked food matrix may produce an observed or perceived texture that varies from soft and/or spongy to crisp and/or crumbly when consumed.

As mentioned above, conventional baked foods incorporate a flour, which is a plant-based powder containing starch components, that participate in the formation of the baked food structure. Starches are digestible complex carbohydrates (polysaccharides), and when consumed by humans metabolize to form glucose. In order to reduce the digestible polysaccharide content and resulting glucose impact of baked foods, a common approach in the modern industry is to attempt to replace the flour component of the baked food with other components or a mixture of such components, such as proteins, fiber, and/or non-digestible polysaccharides such as polydextrose. However, due to the critical role of starch in building the fibrous network associated with traditional baked foods, combined with the fact that starch is often a substantial component of baked foods (for example 25% or even 50% by weight of a batter or dough composition, or even more), efforts in the industry to replace starch altogether have been met with generally unsatisfactory results in meeting consumer's organoleptic expectations.

For example, it is well known that increasing the protein level in a baked food typically results in the loss of the desirable product texture that consumers expect. The loss of desirable texture may result in products described by consumers as being hard, dry, and brick-like; such baked foods typically lack the light, airy or spongy texture associated with the aforementioned fibrous structure and associated air pockets that develop by baking a baked food. The texture of the high protein baked food is thus known to be more compacted and solidified than traditional baked foods. Further, prior attempts to solve textural problems associated with high protein baked foods often only hide unpleasant textural characteristics that become apparent later during consumption, and/or produce off-flavors.

In addition to the challenges associated with improving texture, inclusion of high levels of protein in e.g. food bars also negatively affect the shelf-life of the food bar relative to food bars containing less protein and more carbohydrates. For example, high protein baked goods may become hard and brick like after being on the store shelf for only a short period of time. Even traditional baked goods tend to have short shelf lives, as consumers of baked goods will readily attest, becoming hard or "stale", and deteriorating quickly even when frozen.

As such, an ongoing need exists in the industry for baked foods that provide a high concentration of protein and a low concentration of digestible carbohydrate while obtaining improved texture. There is an ongoing need in the industry for development of starch-free baked foods with texture and organoleptic qualities that are comparable to traditional baked foods. And there is an ongoing need in the industry for baked foods that provide a high concentration of protein while also having an extended shelf life in which the baked food maintains its texture and organoleptic qualities over an extended period of time.

SUMMARY OF THE INVENTION

Described herein are starch-free compositions, which include baked foods and batters for preparation of baked foods having less than 1% by weight of starch. Also described herein are methods of making the starch-free compositions. Also described herein are protein isolate mixtures, and methods of using of the protein isolate mixtures to obtain the starch-free compositions. The starch-free compositions include a protein isolate mixture, water, a fat source, a bulking agent, an emulsifier, a conditioning agent, a glaciation agent, and a thickener. Additional components are optionally included in the starch-free compositions such as sweeteners, salt, flavorings, preservatives, waxes, and sources of $CO_2$ gas.

Also described herein are protein mixtures consisting essentially of, or consisting of mixtures of three different protein components, wherein the protein components are protein concentrates or protein isolates and the three protein components differ from one another in terms of solubility in water and/or particle size when present in an aqueous medium. In embodiments, the three protein components are sourced from the same protein source, that is, the same plant, the same animal, or the same plant product (portion of a plant), or the same animal product (portion of an animal or animal-produced source, such as milk or egg). In embodiments the three protein components are three soy protein components, that is, the three protein components are all sourced from soybean plants. In embodiments the three protein components are milk protein components, that is, the three protein components are all sourced from cow's milk. In embodiments the three protein components are egg protein components, that is, the three protein components are sourced from chicken eggs. In embodiments, the three protein components differ by protein molecular weight. In embodiments the three protein components differ by solubility in water or a water source. In embodiments the three protein components differ by particle size when dissolved, dispersed, or suspended in water or a water source. In embodiments the three protein components differ by solubility in water or a water source and by particle size in the water or water source.

In embodiments, three protein components are combined by admixing to form a protein mixture. The protein mixture includes, in various embodiments, three protein concentrates; two protein concentrates and a protein isolate; a protein concentrate and two protein isolates; or three protein isolates; provided that the selected protein components differ from one another in terms of solubility in water and/or particle size when present in an aqueous medium. The protein mixture may be suitably admixed prior to or during the combining of the three protein components with one or more other starch-free batter components, that is, one or more of the water source, the fat source, the bulking agent, the conditioner, the emulsifier, or the glaciation agent, and/or any one or more optional components of the starch-free batter.

In embodiments the starch-free batter excludes starch. Starch consists of amylose and amylopectin polymers derived from plant sources, wherein the polymers are not chemically modified. Common sources of starch in baked foods include wheat flours and other starch-rich plant flours having more than 10 wt % amylose and/or amylopectin, in embodiments more than 50 wt % amylose and/or amylopectin. In embodiments the starch-free batter excludes digestible polysaccharides. Digestible polysaccharides include but are not limited to starch, β-glucan, fucoidan, laminarin, inulin, and heteropolysaccharides such as pectins.

The protein mixture described herein enables the preparation of starch-free baked food formats including but not limited to doughnuts, muffins, cakes, cookies, and bars as well as other commonly recognized, desirable baked food formats. The starch-free baked foods have an improved texture and extended shelf-life as compared to previously developed low starch, starch-free, and/or high protein baked foods.

Accordingly, disclosed herein is a protein mixture consisting essentially of or consisting of a first protein component having a mean particle size of about 10 μm to about 30 μm in deionized water, as determined by light scattering analysis; a second protein component having a mean particle size of about 40 μm to about 55 μm in deionized water, as determined by light scattering analysis; and a third protein component having a mean particle size of about 50 μm to about 75 μm in deionized water, as determined by light scattering analysis, wherein the protein components are present in the protein mixture at a ratio of about 10 to 13 parts by weight of the first protein component, to about 2 to 5 parts by weight of the second protein component, to about 1 to 4 parts by weight of the third protein component. In embodiments, the first protein component, the second protein component, and the third protein component are all obtained from the same protein source. In embodiments, the protein source is soy, egg, or milk. In embodiments, the protein source is milk, the first protein component is a whey protein isolate, and the second and third protein component are both casein isolates. In embodiments, the protein components are present in the protein mixture at a ratio of about 10.5 to 12.0 parts by weight of the first protein isolate, to about 3.5 to 4.0 parts by weight of the second protein isolate, to about 1.0 to 2.0 parts by weight of the third protein isolate.

Also disclosed herein is a starch-free batter comprising a protein mixture, the protein mixture consisting of a first protein component having a mean particle size of about 10 μm to about 30 μm in deionized water, as determined by light scattering analysis; a second protein component having a mean particle size of about 40 μm to about 55 μm in deionized water, as determined by light scattering analysis; and a third protein component having a mean particle size of about 50 μm to about 75 μm in deionized water, as determined by light scattering analysis. In embodiments the protein components are present in the protein mixture at a ratio of about 10 to 13 parts by weight of the first protein component, to about 3 to 5 parts by weight of the second protein component, to about 1 to 4 parts by weight of the third protein component.

In embodiments, the protein mixture is about 15 wt % to about 25 wt % of a starch-free batter. In embodiments, the first protein component, the second protein component, and the third protein component are all obtained from the same protein source. In embodiments, the protein source is milk, the first protein component is a whey protein isolate, and the second and third protein component are caseins. In embodiments, the protein component are present in the protein mixture at a ratio of about 10.5 to 12.0 parts by weight of the first protein component, to about 3.5 to 4.0 parts by weight of the second protein component, to about 1.0 to 2.0 parts by weight of the third protein component.

In embodiments, the protein mixture is about 15 wt % to about 25 wt % of the starch-free batter. In embodiments, the fat source is about 5 wt % to about 30 wt % of the starch-free batter. In embodiments, the bulking agent is about 10 wt % to about 30 wt % of the starch-free batter. In embodiments, the conditioner or conditioning agent is about 5 wt % to about 15 wt % of the starch-free batter. In embodiments, the emulsifier is about 0.1 wt % to about 2 wt % of the starch-free batter. In embodiments, the glaciation agent is about 5 wt % to about 25 wt % of the starch-free batter. In embodiments, the thickener is about 0.1 wt % to about 2 wt % of the starch-free batter. In embodiments, the water or water source is about 5 wt % to 25 wt % of the starch-free batter.

In embodiments the bulking agent is selected from a polydextrose, an insoluble fiber, a resistant starch, a plant flour having less than 10 wt % starch, a plant meal having less than 10 wt % starch, a plant butter having less than 10 wt % starch, or a combination of two or more of these. In embodiments the conditioner is glycerin (glycerol). In embodiments the emulsifier is a lecithin. In embodiments the glaciation agent is erythritol. In embodiments the thickening agent is a xanthan gum. In embodiments, the starch-free batter further comprises one or more optional additional components selected from sweeteners, salt, flavorings, spices, waxes, preservatives, and $CO_2$ gas sources. In embodiments, the starch-free compositions include no measurable amount of starch, that is, no measurable amount of amylose or amylopectin polymer. In embodiments, the starch-free compositions up to 1 wt % starch. Thus, a starch-free batter includes less than 1 wt % starch, wherein the corresponding starch-free baked food formed by baking the starch-free batter also includes less than 1 wt % starch. In embodiments, a starch-free batter and corresponding starch-free baked food includes no starch, or no measurable amount of starch. In embodiments, a starch-free batter and corresponding starch-free baked food includes no digestible polysaccharides, or no measurable amount of digestible polysaccharides.

Also disclosed herein are starch-free baked foods comprising a protein mixture consisting of a first protein component having a mean particle size of about 10 μm to about 30 μm in deionized water, as determined by light scattering analysis, a second protein component having a mean particle size of about 40 μm to about 55 μm in deionized water, as determined by light scattering analysis, and a third protein component having a mean particle size of about 50 μm to about 75 μm in deionized water, as determined by light scattering analysis, wherein the protein component are present in the protein mixture at a ratio of about 10 to 13 parts by weight of the first protein isolate, to about 3 to 5 parts by weight of the second protein isolate, to about 1 to 4 parts by weight of the third protein isolate.

In embodiments, a starch-free baked food is formed by admixing the components of the starch-free batter described above; and heating the starch-free batter for a period of time and at a temperature to result in formation of a baked product. Accordingly, in embodiments the starch-free baked foods have all the components of the corresponding or initial or "unbaked" starch-free batter, in the same amounts as added to the initial unbaked starch-free batter; except that the starch-free baked foods have a reduced amount of "free water" compared to the initial unbaked starch-free batter, where free water means liquid water that is not chemically bound or adsorbed to another compound or associated as water of hydration. In embodiments, the amount of free water in a starch-free baked food is about 0.50 wt % to about 1.00 wt % of the starch-free baked food.

In embodiments, the protein mixture is about 15 wt % to about 30 wt % of the starch-free baked food. In embodiments, the fat source is about 5 wt % to about 40 wt % of the starch-free baked food. In embodiments, the bulking agent is about 10 wt % to about 35 wt % of the starch-free baked food. In embodiments, the conditioner is about 5 wt % to about 20 wt % of the starch-free baked food. In embodiments, the emulsifier is about 0.1 wt % to about 2.5 wt % of the starch-free baked food. In embodiments, the glaciation agent is about 5 wt % to about 25 wt % of the starch-free baked food. In embodiments, the thickener is about 0.1 wt % to about 2.5 wt % of the starch-free baked food.

Also disclosed herein is a method of making a starch-free baked food, the method comprising the steps of forming a starch-free batter and baking the starch-free batter to form a starch-free baked food, wherein forming the starch-free batter comprises admixing a first protein component having a mean particle size of about 10 μm to about 30 μm in deionized water, as determined by light scattering analysis; a second protein component having a mean particle size of about 40 μm to about 55 μm in deionized water, as determined by light scattering analysis; a third protein component having a mean particle size of about 50 μm to about 75 μm in deionized water, as determined by light scattering analysis; a fat source; a bulking agent; a conditioner; an emulsifier; a thickening agent; a glaciation agent; and a water source. In embodiments the method further includes admixing one or more optional additional components with the starch-free batter. In embodiments the protein components are admixed in a ratio of about 10 to 13 parts by weight of the first protein component, to about 3 to 5 parts by weight of the second protein component, to about 1 to 4 parts by weight of the third protein component. The method further includes heating the starch-free batter to obtain a starch-free baked food. In embodiments, the method further comprises cooling the starch-free baked food after the heating. In embodiments, the method further comprises storing the starch-free baked food for a period of 6 months to 24 months after the cooling.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
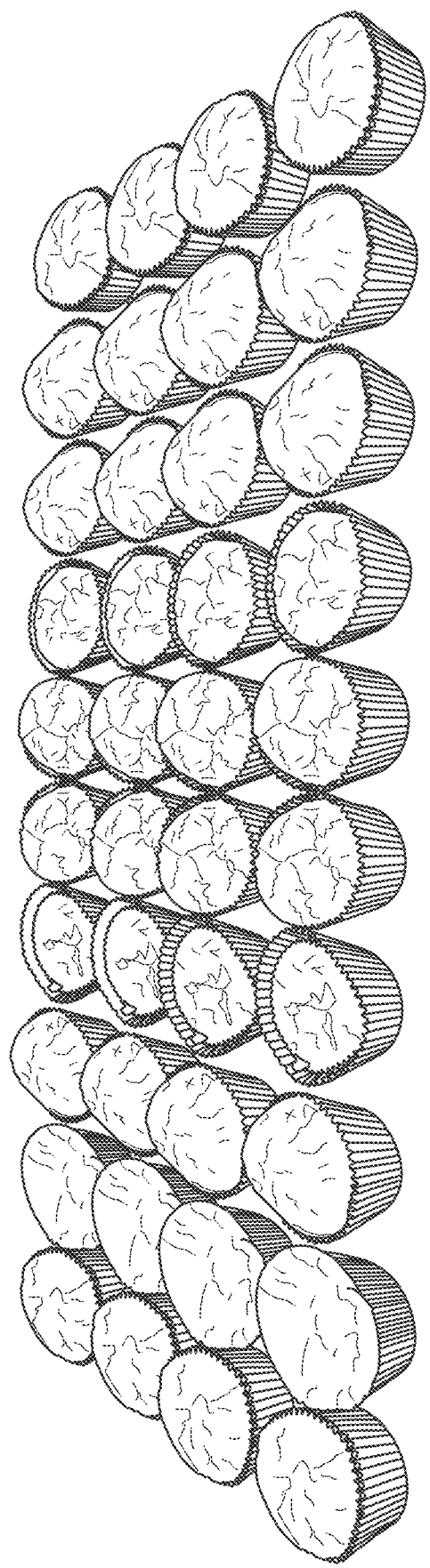
FIG. 1 is a line drawing of a photographic image of the baked products formed in Examples 1-10.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein the term "food", "food component", "food compound", and like terms refer to a compound or material that is edible and nontoxic to humans when included in a baked food article.

As used herein, the term "baked food", singular or plural, refers to a solid or solidified comestible article formed by admixing food components and liquid water at ambient temperature (generally between 17° C. and 22° C.) to form a batter, then heating the batter by placing it in an oven set to a temperature of at least 90° C., often 120° C. or higher, for example as high as 260° C., and for a period of time sufficient to result in a baked food. As defined herein, amounts and percentages recited in connection with a baked food excludes weight of a baked food that is attributable to "whole" ingredients such as whole nuts, nut pieces, candies, candy pieces, fresh or dried fruits, or pieces of fresh or dried fruits. Such ingredients may be present in a baked food in a wide range of amounts which nonetheless do not affect the properties of the corresponding baked food matrices described herein.

As used herein, the term "batter" means an admixture of food components and liquid water that when combined form a slurry that when baked become intimately mixed with and inseparable from the baked food matrix that results from baking: that is, the batter is exclusive of components such as candies, whole fresh or dried fruits, fresh or dried fruit pieces, whole raw or roasted nuts or seeds, raw or roasted nut or seed pieces, and the like that are separable from the baked food matrix after baking of the slurry; and materials suitably added to a baked food after baking: that is, frostings or other surface adornments, and fillings such as custards, compotes, and the like. While any of these items may be suitably added to a batter, such items are not considered a component thereof for purposes of discussion below and also for purposes of calculating weight percent components of the starch-free batters or starch-free baked foods discussed herein. As defined herein, amounts and percentages recited in connection with a batter include only the weight of batter components that become intimately mixed with and inseparable from the baked food matrix that results from baking.

As used herein, the term "starch" means an amylose polymer or an amylopectin (branched amylose) polymer.

As used herein, the term "protein isolate", in singular or plural, means a food protein fraction containing at least about 90% (by weight) of a single species of protein on a moisture-free basis (no measurable free water). Further as used herein, a "protein concentrate", in singular or plural, means a food protein fraction containing between 40% and 90% by weight of a single species of protein on a moisture-free basis. In embodiments, a protein concentrate is converted to a protein isolate by subjecting the protein concentrate to isoelectric precipitation, ultrafiltration, or both. In embodiments, a protein fraction is obtained by isolating a specific protein species from other proteins and also from compounds such as fats and carbohydrates by a fractionation process, such as gel chromatography, or solubilization (extraction) of proteins from the original protein source. Purification of a protein fraction after isolation may be accomplished, in embodiments, by isoelectric precipitation, or by 'salting-out' of more hydrophobic protein molecules to obtain a group of proteins having the same isoelectric point; and in some embodiments, salting out is followed by ultrafiltration of the precipitate to remove one or more salts. In embodiments, a protein concentrate includes at least about 40 wt % of the selected protein species, and in embodiments includes between 40 wt % and 90 wt % of the selected protein species. In embodiments, a protein isolate includes at least about 90 wt % of the selected protein species, and in embodiments includes between 90 wt % and 99+ wt % of the selected protein species, such as 99.9 wt % or even as high as 99.99 wt % of the selected protein species.

As used herein, the terms "water source", "aqueous medium" and similar terms refer to liquid water, optionally having one or more non-polymeric compounds admixed, dissolved, or dispersed therein. In embodiments, such non-polymeric compounds include, for example, salts and pH buffers. Unless otherwise designated, the temperature and pH of a water source is between 17° C. and 22° C., and pH is between 6.0 and 8.0.

As used herein, the term "free water" means liquid water that is not chemically bound or adsorbed to another compound or associated as water of hydration.

As used herein, the term "dissolved", "soluble", "solution" and similar terms refer generally to a compound that forms or is capable of forming a transparent, homogeneous appearing mixture with a water source, as observed by one of ordinary skill, unless otherwise specifically defined herein.

As used herein, the term "dispersed", "dispersion", "suspended", "suspension" and similar terms refer to a compound or mixture of compounds that forms or is capable of forming a cloudy, semi-transparent, opaque, or heterogeneous mixture with a water source, further wherein the compound does not settle out when the mixture is left undisturbed, as observed by one of ordinary skill.

As used herein, the term "particle size" means an average size distribution, a median size distribution, or a mean size distribution obtained by a protein isolate dissolved or dispersed in an aqueous medium. In embodiments, "particle size" refers to a volume-based method of determining a size distribution of discrete protein isolate particles dispersed or suspended in an aqueous medium. Such volume-based methods include light scattering analysis and Coulter counter methods. Unless specified otherwise, "particle size" generally refers to a volume-based average or method of measuring a volume-based average by assuming all particles are spherical. When comparing two or more particulates, differences in median particle sizes and/or other particle size parameters are determined based on the respective individually determined median particle sizes and/or other specified parameters.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

Disclosed herein are starch-free compositions that include a protein mixture that is a mixture of three different protein components. The three different protein components differ from one another in terms of solubility in a water source; and/or particle size obtained when dispersed in a water source, as determined by a volume-based method such as light scattering.

In embodiments, starch-free compositions include, as determined by context, starch-free baked foods and starch-free batters for preparation of starch-free baked foods. The starch-free compositions comprise or consist essentially of the protein mixture of three protein components, further combined with a water source, a fat source, a bulking agent, an emulsifier, a conditioning agent, a glaciation agent, and a thickener. Additional components are optionally included in the starch-free compositions. Such additional components comprise, but are not limited to sweeteners, salt, flavorings, preservatives, and sources of $CO_2$ gas such sodium bicarbonate or citric acid. In embodiments the starch-free compositions exclude starch, which means that the starch content of the starch-free compositions is not measurable. In embodiments the starch-free compositions include less than 1 wt % starch. In embodiments the starch-free compositions exclude digestible polysaccharides, which means that the digestible polysaccharide content of the starch-free compositions is not measurable. In embodiments the starch-free compositions include less than 1 wt % digestible polysaccharides.

Protein mixtures suitable for incorporation in the starch-free compositions consist essentially of or consist of an admixture of three different protein components, wherein the three different protein components differ from one another at least in their solubility in a water source (that is, solubility in the same water source, such as deionized water or tap water) and/or particle size (that is, mean particle size, median particle size, D10, D50, or D90 or some other particle size metric) when dissolved, dispersed, or suspended in the same water source. In embodiments, the three different protein components are obtained from the same protein source, that is, the same plant or the same animal, or the same plant or animal product. In embodiments, the protein source for the three different protein components is selected from soybeans, cow milk, or chicken eggs. Thus, in embodiments the three different protein components are soy protein isolates or soy protein concentrates; that is, each one of the three different protein components are sourced from soybean plants. In other embodiments the three different protein components are milk protein isolates or milk protein concentrates; that is, each one of three different protein components are sourced from cow's milk. In still other embodiments the three different protein components are egg protein isolates or egg protein concentrates, that is, each one of the three different protein components are sourced from chicken eggs. In embodiments, the three different protein components differ from each other in terms of solubility in the same water source. In embodiments, the three different protein components differ from each other in terms of particle size obtained when each of the three different protein components is separately dissolved, dispersed, or suspended in the same water source.

In embodiments, the three different protein components of the protein mixture are each highly refined protein fractions that contain at least about 40% by weight protein on a moisture-free basis and little or no soluble carbohydrates or fiber. Generally, each one of the three different protein fractions include a single protein species, that is separated, from other proteins arising from the same original protein source, that is, the plant, animal, plant product, or animal product source; and also separated from non-protein compounds that are components of the original protein source, such as fats and carbohydrates. Such separations are achieved using a fractionation process, such as gel chromatography, or solubilization (extraction) of proteins from the original protein source. In embodiments, the product of such separation (that is, fractionation or extraction) is a protein concentrate, which includes at least 40 wt % of the separated protein species.

In embodiments, a protein concentrate is further subjected to isoelectric precipitation, or 'salting-out' of more hydrophobic protein molecules to obtain a group of proteins having the same isoelectric point; and in embodiments, isoelectric precipitation is followed by ultrafiltration of the precipitate to remove additional impurities, especially salts and other non-polymeric components such as sugars. In embodiments, a protein concentrate is converted to a protein isolate by subjecting a protein concentrate to isoelectric precipitation, ultrafiltration, or both isoelectric precipitation and ultrafiltration. Both protein concentrates and protein isolates are useful in various embodiments herein for obtaining the protein mixture of three protein components disclosed herein, which in turn is incorporated in the starch-free batters and starch-free baked foods disclosed herein.

In embodiments, the three different protein components of the protein isolate admixture are referred to herein as the first protein component, second protein component, and third protein component. In embodiments, the first protein component is a water soluble protein component. As applied to a protein isolate herein, "soluble in water" and like terms indicates that the protein component has a soluble solids content of >90%, which is determined by either: calculating degree of hydrolysis in accord with >90 moles Nitrogen (as $NH_2$)/100 kg protein; or by mixing the protein with water at neutral pH, subjecting the mixture to centrifugation, and determining that >90% protein concentration (wt/wt or wt/vol basis) remains in the supernatant.

In embodiments, the first protein component dispersed, suspended, or dissolved in deionized water obtains a mean particle size of about 10 μm to about 30 μm as determined by light scattering analysis, for example 12 μm to 30 μm, or 14 μm to 30 μm, or 16 μm to 30 μm, or 18 μm to 30 μm, or 20 μm to 30 μm, or 22 μm to 30 μm, or 24 μm to 30 μm, or 26 μm to 30 μm, or 28 μm to 30 μm, or 10 μm to 28 μm, or 12 μm to 28 μm, or 14 μm to 28 μm, or 16 μm to 28 μm, or 18 μm to 28 μm, or 20 μm to 28 μm, or 22 μm to 28 μm, or 24 μm to 28 μm, or 26 μm to 28 μm, or 10 μm to 12 μm, or 12 μm to 14 μm, or 14 μm to 16 μm, or 16 μm to 18 μm, or 18 μm to 20 μm, or 20 μm to 22 μm, or 22 μm to 24 μm, or 24 μm to 26 μm, or 26 μm to 28 μm, or 28 μm to 30 μm as determined by light scattering analysis. In some embodiments, the first protein component dispersed, suspended, or dissolved in deionized water obtains a D10 of about 10 μm or less, as determined by light scattering analysis, for example 10 μm to 2 μm, or 10 μm to 3 μm, or 10 μm to 4 μm, or 10 μm to 5 μm, or 10 μm to 6 μm, or 10 μm to 7 μm, or 10 μm to 8 μm, or 10 μm to 9 μm, or about 10 μm, or about 9 μm, or about 8 μm, or about 7 μm, or about 6 μm, or about 5 μm, or about 4 μm, or about 3 μm, or about 2 μm, or about 1 μm, or less than 1 μm, as determined by light scattering analysis. In embodiments, the first protein component dispersed, suspended, or dissolved in deionized water obtains a D50 (that is, the median particle size) of about 10 μm to about 30 μm as determined by light scattering analysis, for example 12 μm to 30 μm, or 14 μm to 30 μm, or 16 μm to 30 μm, or 18 μm to 30 μm, or 20 μm to 30 μm, or 22 μm to 30 μm, or 24 μm to 30 μm, or 26 μm to 30 μm, or 28 μm to 30 μm, or 10 μm to 28 μm, or 12 μm to 28 μm, or 14 μm to 28 μm, or 16 μm to 28 μm, or 18 μm to 28 μm, or 20 μm to 28 μm, or 22 μm to 28 μm, or 24 μm to 28 μm, or 26 μm to 28 μm, or 10 μm to 12 μm, or 12 μm to 14 μm, or 14 μm to 16 μm, or 16 μm to 18 μm, or 18 μm to 20 μm, or 20 μm to 22 μm, or 22 μm to 24 μm, or 24 μm to 26 μm, or 26 μm to 28 μm, or 28 μm to 30 μm as determined by light scattering analysis. In embodiments, the first protein component dispersed, suspended, or dissolved in deionized water obtains a D90 of about 30 μm to about 40 μm, as determined by light scattering analysis, such as 30 μm to 38 μm, or 30 μm to 36 μm, or 30 μm to 34 μm, or 30 μm to 32 μm, or 32 μm to 40 μm, or 34 μm to 40 μm, or 36 μm to 40 μm, or 38 μm to 40 μm as determined by light scattering analysis.

In embodiments, the first protein component is a water soluble milk protein component, a water soluble soy protein component, or a water soluble egg protein component. In embodiments, the first protein component is a whey protein isolate obtained from cow's milk, such as HILLMAR™ 9000 Whey Protein Isolate, obtained from Hillmar Ingredients of Hillmar, Calif.

In embodiments, the second protein component is a majority-soluble protein component, which is a protein component having a soluble solids index of >50% to 90%, as defined by degree of hydrolysis in accord with 50 to 90 moles Nitrogen (as $NH_2$)/100 kg protein; or by mixing the protein with water at neutral pH, subjecting the mixture to centrifugation, and measuring >50% to 90% of protein concentration (wt/wt or wt/vol basis) remaining in the supernatant. In embodiments, the second protein component has a soluble solids index of about 55% to about 90%, such as 60% to 90%, or 65% to 90%, or 70% to 90%, or 75% to 90%, or 80% to 90%, or 85% to 95%, or 55% to 85%, or 55% to 80%, or 55% to 75%, or 55% to 70%, or 55% to 65%, or 55% to 60%, or about 55%, or about 60%, or about 65%, or about 70%, or about 75%, or about 80%, or about 85%, or about 90%. In embodiments, the second protein component dispersed, suspended, or dissolved in deionized water obtains a mean particle size of about 40 μm to about 55 μm as determined by light scattering analysis, for example 42 μm to 55 μm, or 44 μm to 55 μm, or 46 μm to 55 μm, or 48 μm to 55 μm, or 50 μm to 55 μm, or 52 μm to 55 μm, or 54 μm to 55 μm, or 40 μm to 53 μm, or 40 μm to 51 μm, or 40 μm to 49 μm, or 40 μm to 47 μm, or 40 μm to 45 μm, or 40 μm to 43 μm, or 45 μm to 55 μm, or 47 μm to 52 μm, or 40 μm to 42 μm, or 42 μm to 44 μm, or 44 μm to 46 μm, or 46 μm to 48 μm, or 48 μm to 50 μm, or 50 μm to 52 μm, or 52 μm to 54 μm, or 54 μm to 55 μm, or about 40 μm, or about 41 μm, or about 42 μm, or about 43 μm, or about 44 μm, or about 45 μm, or about 46 μm, or about 47 μm, or about 48 μm, or about 49 μm, or about 50 μm, or about 51 μm, or about 52 μm, or about 53 μm, or about 54 μm, or about 55 μm, as determined by light scattering analysis. In embodiments, the second protein component dispersed, suspended, or dissolved in deionized water obtains a D10 of about 10 μm to about 20 μm, as determined by light scattering analysis, for example 10 μm to 18 μm, or 10 μm to 16 μm, or 10 μm to 14 μm, or 10 μm to 12 μm, or 12 μm to 20 μm, or 14 μm to 20 μm, or 16 μm to 20 μm, or 18 μm to 20 μm, or about 10 μm, or about 11 μm, or about 12 μm, or about 13 μm, or about 14 μm, or about 15 μm, or about 16 μm, or about 17 μm, or about 18 μm, or about 19 μm, or about 20 μm, as determined by light scattering analysis. In embodiments, the second protein component dispersed, suspended, or dissolved in deionized water obtains a D50 (that is, the median particle size) of about 40 μm to about 50 μm as determined by light scattering analysis, for example 41 μm to 50 μm, or 42 μm to 50 μm, or 43 μm to 50 μm, or 44 μm to 50 μm, or 45 μm to 50 μm, or 46 μm to 50 μm, or 47 μm to 50 μm, or 48 μm to 50 μm, or 49 μm to 50 μm, or 40 μm to 49 μm, or 40 μm to 48 μm, or 40 μm to 47 μm, or 40 μm to 46 μm, or 40 μm to 45 μm, or 40 μm to 44 μm, or 40 μm to 43 μm, or 40 μm to 42 μm, or 40 μm to 41 μm, or about 40 μm, or about 41 μm, or about 42 μm, or about 43 μm, or about 44 μm, or about 45 μm, or about 46 μm, or about 47 μm, or about 48 μm, or about 49 μm, or about 50 μm as determined by light scattering analysis. In embodiments, the second protein component dispersed, suspended, or dissolved in deionized water obtains a D90 of about 50 μm to about 100 μm, as determined by light scattering analysis, such as 50 μm to 90 μm, or 50 μm to 80 μm, or 50 μm to 70 μm, or 50 μm to 60 μm, or 60 μm to 100 μm, or 70 μm to 100 μm, or 80 μm to 100 μm, or 90 μm to 100 μm as determined by light scattering analysis.

In embodiments, the second protein component is a majority-soluble milk protein component, a majority-soluble soy protein component, or a majority-soluble egg protein component. In embodiments, the second protein component is a caseinate obtained from cow's milk. In embodiments, the second protein component is a calcium caseinate. A suitable second protein component is NZMP™ SUREPROTEIN™ Calcium Caseinate 380, a protein isolate obtained from Fonterra Co-operative Group Ltd. of New Zealand.

In embodiments, the third protein component is a majority-insoluble protein component, which is a protein component having a soluble solids index of 50% or less, as defined by degree of hydrolysis in accord with 50 moles or less Nitrogen (as $NH_2$)/100 kg protein; or by mixing the protein with water at neutral pH, subjecting the mixture to centrifugation, and measuring 50% or less of the protein concentration (wt/wt or wt/vol basis) remaining in the supernatant. In embodiments, the second protein component has a soluble solids index of about 20% to about 50%, such as 25% to 50%, or 30% to 50%, or 35% to 50%, or 40% to 50%, or 45% to 50%, or 20% to 45%, or 20% to 40%, or 20% to 35%, or 20% to 30%, or 20% to 25%, or 25% to 30%, or 30% to 35%, or 35% to 40%, or 40% to 45%, or 45% to 50%, or about 25%, or about 26%, or about 27%, or about 28%, or about 29%, or about 30%, or about 31%, or about 32% or about 33%, or about 34%, or about 35%, or about 36%, or about 37%, or about 38%, or about 39%, or about 40%. In embodiments, the third protein component dispersed, suspended, or dissolved in deionized water obtains a mean particle size of about 50 μm to about 75 μm as determined by light scattering analysis, for example 50 μm to 75 μm, or 55 μm to 75 μm, or 60 μm to 75 μm, or 65

μm to 75 μm, or 70 μm to 75 μm, or 50 μm to 70 μm, or 50 μm to 65 μm, or 50 μm to 60 μm, or 50 μm to 55 μm, or 55 μm to 60 μm, or 60 μm to 65 μm, or 65 μm to 70 μm, or about 55 μm, or about 56 μm, or about 57 μm, or about 58 μm, or about 59 μm, or about 60 μm, or about 61 μm, or about 62 μm, or about 63 μm, or about 64 μm, or about 65 μm, or about 70 μm, or about 75 μm, as determined by light scattering analysis. In embodiments, the third protein component dispersed, suspended, or dissolved in deionized water obtains a D10 of about 10 μm to about 30 μm, as determined by light scattering analysis, for example 10 μm to 30 μm, or 10 μm to 25 μm, or 10 μm to 20 μm, or 10 μm to 15 μm, or 15 μm to 30 μm, or 20 μm to 30 μm, or 25 μm to 30 μm, or 15 μm to 25 μm, or about 10 μm, or about 11 μm, or about 12 μm, or about 13 μm, or about 14 μm, or about 15 μm, or about 16 μm, or about 17 μm, or about 18 μm, or about 19 μm, or about 20 μm, or about 21 μm, or about 22 μm, or about 23 μm, or about 24 μm, or about 25 μm, or about 26 μm, or about 27 μm, or about 28 μm, or about 29 μm, or about 30 μm, as determined by light scattering analysis. In embodiments, the third protein component dispersed, suspended, or dissolved in deionized water obtains a D50 (that is, the median particle size) of about 40 μm to about 80 μm as determined by light scattering analysis, for example 40 μm to 80 μm, or 45 μm to 80 μm, or 50 μm to 80 μm, or 55 μm to 80 μm, or 60 μm to 80 μm, or 65 μm to 80 μm, or 40 μm to 75 μm, or 40 μm to 70 μm, or 40 μm to 65 μm, or 40 μm to 60 μm, or 40 μm to 55 μm, or 40 μm to 50 μm, or 40 μm to 45 μm, or about 40 μm, or about 42 μm, or about 44 μm, or about 46 μm, or about 48 μm, or about 50 μm, or about 52 μm, or about 54 μm, or about 56 μm or about 58 μm, or about 60 μm, or about 62 μm, or about 64 μm, or about 66 μm, or about 68 μm, or about 70 μm, or about 72 μm, or about 74 μm, or about 76 μm, or about 78 μm, or about 80 μm as determined by light scattering analysis. In embodiments, the third protein component dispersed, suspended, or dissolved in deionized water obtains a D90 of about 90 μm to about 150 μm, as determined by light scattering analysis, such as 90 μm to 150 μm, or 90 μm to 140 μm, or 90 μm to 130 μm, or 90 μm to 120 μm, or 90 μm to 110 μm, or 90 μm to 100 μm, or 100 μm to 150 μm, or 110 μm to 150 μm, or 120 μm to 150 μm, or 130 μm to 150 μm, or 140 μm to 150 μm, or 100 μm to 140 μm, or 100 μm to 130 μm, or 100 μm to 120 μm, or 110 μm to 140 μm, or 110 μm to 130 μm, or 110 μm to 120 μm, as determined by light scattering analysis.

In embodiments, the third protein isolate is a majority-insoluble milk protein component, a majority-insoluble soy protein component, or a majority-insoluble egg protein component. In embodiments, the third protein component is a casein obtained from cow's milk. In embodiments, the third protein component is a calcium caseinate obtained from cow's milk. A suitable third protein component is Micellar Casein PIN 100917, obtained from Milk Specialties Global of Eden Prairie, Minn.

In embodiments, the first protein component, the second protein component, and the third protein component are present in a starch-free batter as the only proteins in the starch-free batter. In embodiments, the first protein component, the second protein component, and the third protein component are present in a starch-free batter or the starch-free baked food as the only fractionated proteins therein. In some embodiments, the first protein component, the second protein component, and/or the third protein component are present in a starch-free batter or the starch-free baked food as the only protein concentrates therein. In some embodiments, the first protein component, the second protein component, and/or the third protein component are present in a starch-free batter or starch-free baked food as the only protein isolates therein.

In embodiments, the first protein component, the second protein component, and the third protein component are present in a starch-free composition in a ratio of about 10 to 13 parts by weight of the first protein component, to about 3 to 5 parts by weight of the second protein component, to about 1 to 4 parts by weight of the third protein component. In embodiments, the first protein component, the second protein component, and the third protein component are present in a starch-free composition in a ratio of about 10.5 to 12.0 parts by weight of the first protein component, to about 3.5 to 4.0 parts by weight of the second protein component, to about 1.0 to 2.0 parts by weight of the third protein component. In embodiments, the first protein component, the second protein component, and the third protein component are present in a starch-free composition in a ratio of about 10.5 to 11.5 parts by weight of the first protein component, to about 3.5 to 4.0 parts by weight of the second protein component, to about 1.4 to 1.6 parts by weight of the third protein component.

In embodiments, the first protein component, the second protein component, and the third protein component are admixed to form a protein mixture in the weight ratios recited above, whether or not the three different protein components are combined alone or in the presence of one or more of the water source, the fat source, the bulking agent, the conditioning agent, the emulsifier, the thickening agent, the glaciation agent, and optional additional components selected from sweeteners, salt, flavorings or spices, waxes, preservatives, and $CO_2$ gas sources such as citric acid or sodium bicarbonate.

As used herein, amounts and percentages recited in connection with a starch-free batter excludes weight attributable to "whole" ingredients such as whole nuts, nut pieces, candies, candy pieces, fresh or dried fruits, or pieces of fresh or dried fruits. Such ingredients may be added to any of the starch-free batters described herein, but are still separable from the baked food matrix after baking the starch-free batter. Accordingly, 100 wt % of a starch-free batter and further 100 wt % of a starch-free baked food described herein is formed by combining a protein mixture, a water source, a fat source, a bulking agent, a conditioning agent, an emulsifier, a thickening agent, and a glaciation agent, plus one or more optional additional components selected from sweeteners, salt, flavorings or spices, waxes, preservatives, and $CO_2$ gas sources such as citric acid or sodium bicarbonate.

In embodiments, the protein mixture is added to a starch-free batter in an amount of about 15 wt % to about 25 wt % of the total weight of the starch-free batter, for example 15 wt % to 25 wt %, or 16 wt % to 25 wt %, or 17 wt % to 25 wt %, or 18 wt % to 25 wt %, or 19 wt % to 25 wt %, or 20 wt % to 25 wt %, or 21 wt % to 25 wt %, or 22 wt % to 25 wt %, or 23 wt % to 25 wt %, or 24 wt % to 25 wt %, or 15 wt % to 24 wt %, or 15 wt % to 23 wt %, or 15 wt % to 22 wt %, or 15 wt % to 21 wt %, or 15 wt % to 20 wt %, or 15 wt % to 19 wt %, or 15 wt % to 18 wt %, or 15 wt % to 17 wt %, or 15 wt % to 16 wt %, or 16 wt % to 17 wt %, or 17 wt % to 18 wt %, or 18 wt % to 19 wt %, or 19 wt % to 20 wt %, or 20 wt % to 21 wt %, or 21 wt % to 22 wt %, or 22 wt % to 23 wt %, or 23 wt % to 24 wt %, or 24 wt % to 25 wt %, or about 15 wt %, or about 15.5 wt %, or about 16 wt %, or about 16.5 wt %, or about 17 wt %, or about 17.5 wt %, or about 18 wt %, or about 18.5 wt %, or about 19 wt %, or about 19.5 wt %, or about 20 wt %, or about 21 wt %, or about 22 wt %, or about 23 wt %, or about 24 wt %, or about 25 wt %. After baking the starch-free batter to form a starch-free baked food, the protein mixture is present in the starch-free baked food in amount of about 15 wt % to about 30 wt % of the total weight of the starch-free baked food, for example 15 wt % to 20 wt %, or 20 wt % to 25 wt %, 25 wt % to 30 wt %, or 17 wt % to 25 wt %, or 18 wt % to 25 wt %, or 19 wt % to 25 wt %, or 15 wt % to 18 wt %, or 15 wt % to 17 wt %, or 15 wt % to 16 wt %, or 16 wt % to 17 wt %, or 17 wt % to 18 wt %, or 18 wt % to 19 wt %, or 19 wt % to 20 wt %, or 20 wt % to 21 wt %, or 21 wt % to 22 wt %, or 22 wt % to 23 wt %, or 23 wt % to 24 wt %, or 24 wt % to 25 wt %, or 25 wt % to 26 wt %, or 26 wt % to 27 wt %, or 27 wt % to 28 wt %, or 28 wt % to 29 wt %, or 29 wt % to 30 wt % of the total weight of the starch-free baked food.

In embodiments, the protein mixture is further admixed with a water source, a fat source, a bulking agent, a conditioning agent, an emulsifier, a thickener, and a glaciation agent; and optionally one or more additional components selected from sweeteners, salt, flavorings, spices, waxes, preservatives, and $CO_2$ gas sources such as citric acid or sodium bicarbonate to obtain a starch-free batter. After the admixing, the starch-free batter is heated, or baked, to form a starch-free baked food.

Thus, in embodiments, a starch-free batter is formed by admixing the starch-free batter components at ambient temperature which is often between 17° C. and 23° C. That is, the starch-free batter is suitably formed by admixing a protein mixture with a water source, a fat source, a bulking agent, a conditioning agent, an emulsifier, a thickener, and a glaciation agent in any order. The water source may be added directly to the starch-free batter, or it may be added to the starch-free batter as premixed with one or more of the starch-free batter components, for example as provided by a supplier; often, a combination of premixed and directly added water is added to the starch-free batter. The water source may dissolve or partially dissolve one or more of the components present in the starch-free batter. The order of mixing of the starch-free batter components is not limited and any order of mixing will result in formation of a starch-free batter suitable for baking to result in a starch-free baked food.

Thus, a starch-free baked food is formed by heating a starch-free batter for a period of time sufficient to result in a starch-free baked comestible article having properties recognizable as baked food matrix properties associated with conventional muffins, cakes, doughnuts, and the like. In embodiments, baking is carried out by placing the starch-free batter in an oven set to a temperature of at least 90° C., often 120° C. or higher, for example as high as 260° C. for a period of time sufficient to result in a starch-free baked food; and then the starch-free baked food is removed from the oven and allowed to cool to ambient temperature. In embodiments, the heating is convection heating. In embodiments, the cooling rate of the starch-free baked food is increased by placing the starch-free baked food in a refrigerated container set to a temperature below 15° C., such as 10° C. or lower, 5° C. or lower, or 0° C. or lower. In embodiments the temperature of the heating and the amount of time required to heat the starch-free batter is readily determined by one of ordinary skill, for example by adjusting the set temperature of the oven used to heat the starch-free batter; or by adjusting the volume or format of the containment used to hold the starch-free batter during the heating, and then checking the state of the starch-free batter during the heating. After a sufficient heating time has passed for the starch-free batter to be transformed into a starch-free baked food, the heating is stopped, in embodiments by removing the starch-free baked food from the oven mentioned above; and the starch-free baked food is allowed to cool sufficiently for safe human consumption, often to an ambient temperature that is between about 15° C. and 23° C. or between about 17° C. and 21° C.

Thus, in embodiments, a starch-free baked food is formed by admixing a protein mixture, liquid water, a fat source, a bulking agent, a conditioning agent, an emulsifier, a thickening agent, and a glaciation agent, along with any optional additional components desired, to form a starch-free batter; and baking the starch-free batter to form a starch-free baked food. In embodiments, the combination of the protein mixture, water or water source, fat source, bulking agent, conditioning agent, emulsifier, thickening agent, and glaciation agent constitute between about 70 wt % and about 98 wt % of the total weight of a starch-free batter, for example 75 wt % to 98 wt %, or 75 wt % to 95 wt %, or 80 wt % to 95 wt %, or 85 wt % to 95 wt %, or 90 wt % to 95 wt %, or 70 wt % to 75 wt %, or 75 wt % to 80 wt %, or 80 wt % to 85 wt %, or 85 wt % to 90 wt %, or 90 wt % to 95 wt %, or about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, or about 98% of the total weight of a starch-free batter; and the remainder of the starch-free batter is a selected combination of one or more optional additional batter components. In embodiments, the one or more additional batter components are added to impart a recognizable and/or desirable flavoring to the starch-free baked food. In embodiments, the one or more additional batter components include natural flavoring extracts and oils, citric acid, and spices. In embodiments, the one or more additional batter components such as citric acid, sodium carbonate, or sodium bicarbonate are added to the starch-free batter to cause $CO_2$ bubbles to form within the starch-free composition during baking thereof, and assist in providing pockets of air defined by and surrounded by a starch-free baked food matrix in the starch-free baked foods described herein. In embodiments, one or more of the optional additional batter components are added to preserve the freshness of the starch-free baked food, or impart one or more other beneficial properties to the starch-free baked food or to the starch-free batter during baking thereof.

Additionally, in embodiments, a starch-free batter is formed by admixing a protein mixture, a fat source, a bulking agent, a conditioner, an emulsifier, a thickening agent, and a glaciation agent, any optional additional components desired, and about 5 wt % to 25 wt % of a water source based on the total weight of the starch-free batter. These starch-free batter components, or ingredients, may be admixed in any order. In embodiments it is advantageous to admix the "dry" ingredients together, and separately to admix the "wet" or liquid-type components together, and then admix the dry and wet admixtures together to form the starch-free batter. Other orders of addition and mixing of starch-free batter components is easily achieved and may be suitably determined by one or ordinary skill in the art.

In embodiments the protein mixture is admixed prior to addition of the protein mixture to the starch-free batter. In embodiments the first protein component, second protein component, and the third protein component are added separately to the starch-free batter, and the three protein components are admixed along with the other starch-free batter components to form the starch-free batter.

In embodiments the fat source added to the starch-free compositions is not particularly limited and includes any of the fat sources commonly employed in traditional baked foods. Such fat sources are derived from plants or animals. Thus, in embodiments, the fat source comprises, consists essentially of, or consists of butter, vegetable shortening, lard, canola oil, sunflower oil, safflower oil, grapeseed oil, avocado oil, peanut oil, palm oil, palm kernel oil, and mixtures of two or more of these. Additionally, in embodiments, a fat source may be enriched or fortified by the addition of one or more other components to the fat source. For example, in embodiments, a fat source is enriched in unsaturated fats or fatty acids such as oleic acid.

In embodiments, the fat source is added to a starch-free batter in an amount that is about 5 wt % to about 30 wt % of the starch-free batter, for example 5 wt % to 28 wt %, or 5 wt % to 26 wt %, or 5 wt % to 24 wt %, or 5 wt % to 22 wt %, or 5 wt % to 20 wt %, or 5 wt % to 18 wt %, or 5 wt % to 16 wt %, or 5 wt % to 14 wt %, or 5 wt % to 12 wt %, or 5 wt % to 10 wt %, or 6 wt % to 30 wt %, or 8 wt % to 30 wt %, or 10 wt % to 30 wt %, or 12 wt % to 30 wt %, or 14 wt % to 30 wt %, or 16 wt % to 30 wt %, or 18 wt % to 30 wt %, or 20 wt % to 30 wt %, or 22 wt % to 30 wt %, or 24 wt % to 30 wt %, or 26 wt % to 30 wt %, or 28 wt % to 30 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or 19 wt % to 21 wt %, or 21 wt % to 23 wt %, or 23 wt % to 25 wt %, or 25 wt % to 27 wt %, or 27 wt % to 30 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt %, or about 21 wt %, or about 22 wt %, or about 23 wt %, or about 24 wt %, or about 25 wt %, or about 26 wt %, or about 27 wt %, or about 28 wt %, or about 29 wt %, or about 30 wt % of the starch-free batter. In embodiments, the fat source is present in a starch-free baked food in an amount that is about 5 wt % to about 40 wt % of the starch-free baked food, for example 5 wt % to 35 wt %, or 5 wt % to 30 wt %, or 5 wt % to 25 wt %, or 5 wt % to 20 wt %, or 5 wt % to 15 wt %, or 5 wt % to 10 wt %, or 10 wt % to 15 wt %, or 15 wt % to 20 wt %, or 20 wt % to 25 wt %, or 25 wt % to 30 wt %, or 30 wt % to 35 wt %, or 35 wt % to 40 wt %, or 10 wt % to 30 wt %, or 12 wt % to 30 wt %, or 14 wt % to 30 wt %, or 16 wt % to 30 wt %, or 18 wt % to 30 wt %, or 20 wt % to 30 wt %, or 22 wt % to 30 wt %, or 24 wt % to 30 wt %, or 26 wt % to 30 wt %, or 28 wt % to 30 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or 19 wt % to 21 wt %, or 21 wt % to 23 wt %, or 23 wt % to 25 wt %, or 25 wt % to 27 wt %, or 27 wt % to 30 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt %, or about 21 wt %, or about 22 wt %, or about 23 wt %, or about 24 wt %, or about 25 wt %, or about 26 wt %, or about 27 wt %, or about 28 wt %, or about 29 wt %, or about 30 wt %, or about 31 wt %, or about 32 wt %, or about 33 wt %, or about 34 wt %, or about 35 wt %, or about 36 wt %, or about 37 wt %, or about 38 wt %, or about 39 wt %, or about 40 wt % of the total weight of the starch-free baked food.

The bulking agent provides weight replacement in the starch-free compositions that would otherwise be provided by e.g. a wheat flour or other starch-bearing flour component. In embodiments the bulking agent is a mixture of two bulking components. In embodiments the bulking agent is a mixture of three bulking components. In embodiments the bulking agent is a mixture of four bulking components. In embodiments the one, two, three, or four bulking components are selected from: polydextrose, insoluble fiber, resistant starch, plant flour having less than 10 wt % starch, plant meal having less than 10 wt % starch, and plant butter having less than 10 wt % starch. One or more bulking components are suitably added to a starch-free batter as an admixture thereof, or are suitably mixed as separate bulking components of a starch-free batter, and are admixed therein in any order. In embodiments, the total amount of the bulking components—that is, the bulking agent—added to a starch-free batter is about 10 wt % to about 30 wt % of the starch-free batter. In embodiments, the bulking agent is present in a starch-free baked food in an amount that is about 10 wt % to about 35 wt % of the starch-free baked food.

In embodiments, a first suitable bulking component is a condensation polymer or copolymer of D-glucose, or dextrose; that is, a polydextrose. Polydextrose is suitably added to a starch-free batter in an amount of about 5 wt % to about 20 wt % of the total weight of the starch-free batter. Polydextrose is an indigestible polysaccharide that often is supplied having a weight average molecular weight of about 20,000 g/mol or less, but higher or lower molecular weight polymers are also useful as the first bulking component. In embodiments, the polydextrose is a polydextrose copolymer, wherein one or more additional sugar moieties are copolymerized with D-glucose. In embodiments, the polydextrose is a functionalized polydextrose, wherein one or more additional chemical moieties are reacted with the polymerized D-glucose (that is, the polydextrose). An exemplary but nonlimiting example of a polydextrose that is useful as a first bulking component in the starch-free compositions is LITESSE® ULTRA™ Powder, a sorbitol-functionalized polydextrose available from Danisco UK Limited of Surrey, United Kingdom.

Polydextrose is suitably added to a starch-free batter in an amount of about 5 wt % to about 20 wt % of the total weight of the starch-free batter, for example 5 wt % to 18 wt %, or 5 wt % to 16 wt %, or 5 wt % to 14 wt %, or 5 wt % to 12 wt %, or 5 wt % to 10 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt % of the starch-free batter. In embodiments, the polydextrose is present in a starch-free baked food in an amount of about 5 wt % to about 25 wt % of the total weight of the starch-free baked food, for example 5 wt % to 25 wt %, 5 wt % to 20 wt %, 5 wt % to 18 wt %, or 5 wt % to 16 wt %, or 5 wt % to 14 wt %, or 5 wt % to 12 wt %, or 5 wt % to 10 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt %, or about 21 wt %, or about 22 wt %, or about 23 wt % or about 24 wt %, or about 25 wt % of the total weight of the starch-free baked food.

In embodiments, a second suitable bulking component is a meal, flour, or butter consisting of one or more fruit, nut, or legume sources and including less than 10% by weight starch. A butter is a fruit, nut, or legume source ground into a paste or slurry. A meal is a fruit, nut, or legume flour having a coarser grain size than that associated conventionally with flours. One of ordinary skill may select the format—that is, flour, meal, or butter—in addition to the source, in order to provide suitable flavor and texture to the starch-free baked food. A suitable source for the meal, flour, or butter is almonds. Almonds include less than 10% starch by weight, often less than 8 wt % or even less than 7 wt %, depending on the batch and variety. Grinding almonds can result in formation of almond butter, almond meal, or almond flour, as suitably selected by the user.

In embodiments, a meal, flour, or butter bulking component is added to a starch-free batter in an amount of about 5 wt % to 13 wt %, or 5 wt % to 12 wt %, or 5 wt % to 11 wt %, or 5 wt % to 10 wt %, or 5 wt % to 9 wt %, or 5 wt % to 8 wt %, or 5 wt % to 7 wt %, or 5 wt % to 6 wt %, or 6 wt % to 10 wt %, or 7 wt % to 10 wt %, or 8 wt % to 10 wt %, or 9 wt % to 10 wt %, or 5 wt % to 6 wt %, or 6 wt % to 7 wt %, or 7 wt % to 8 wt %, or 8 wt % to 9 wt %, or about 5 wt %, or about 6 wt %, or about 7 wt %, or about 8 wt %, or about 9 wt % of the starch-free batter. In embodiments, the meal, flour, or butter bulking component is present in a starch-free baked food in an amount of 15 wt % or less of the total weight of the starch-free baked food, for example 5 wt % to 15 wt %, or 5 wt % to 14 wt %, or 5 wt % to 13 wt %, or 5 wt % to 12 wt %, or 5 wt % to 11 wt %, or 5 wt % to 10 wt %, or 5 wt % to 9 wt %, or 5 wt % to 8 wt %, or 5 wt % to 7 wt %, or 5 wt % to 6 wt %, or 6 wt % to 10 wt %, or 7 wt % to 10 wt %, or 8 wt % to 10 wt %, or 9 wt % to 10 wt %, or 10 wt % to 15 wt %, or 5 wt % to 6 wt %, or 6 wt % to 7 wt %, or 7 wt % to 8 wt %, or 8 wt % to 9 wt %, or 9 wt % to 10 wt %, or 10 wt % to 11 wt %, or 11 wt % to 12 wt %, or 12 wt % to 13 wt %, or 13 wt % to 14 wt %, or 14 wt % to 15 wt %, or about 5 wt %, or about 6 wt %, or about 7 wt %, or about 8 wt %, or about 9 wt %, or about 10 wt %, or about 11 wt %, or about 12 wt %, or about 13 wt %, or about 14 wt %, or about 15 wt % of the total weight of the starch-free baked food.

In embodiments, a third suitable bulking component is an insoluble fiber comprising, consisting essentially of, or consisting of a cellulose. Such materials are referred to in the industry as "dietary fiber" or "nutritional fiber" and are celluloses or derivatives thereof that are derived from plant sources such as oats (oat fiber), flaxseed (flaxseed fiber), wheat (wheat fiber), acacia (acacia fiber), barley (barley fiber), psyllium seed (psyllium fiber), potatoes (potato fiber), beans (bean fiber), and peas (pea fiber). Exemplary but non-limiting examples of suitable insoluble fiber include VITACEL® powdered cellulose and dietary fibers sold by J. Rettenmaier & Sohne GmbH & Co. KG of Rosenberg, Germany.

In embodiments, the insoluble fiber is added to the starch-free batter in an amount that is about 1 wt % to about 5 wt % of the starch-free batter, for example 2 wt % to 5 wt %, or 3 wt % to 5 wt %, or 4 wt % to 5 wt %, or 1 wt % to 4 wt %, or 1 wt % to 3 wt %, or 1 wt % to 2 wt %, or 2 wt % to 3 wt %, or 3 wt % to 4 wt %, or 2 wt % to 4 wt %, or about 1 wt %, %, or about 2 wt %, or about 3 wt %, or about 4 wt %, or about 5 wt % of the starch-free batter. In embodiments, the insoluble fiber is present in a starch-free baked food in an amount that is about 1 wt % to about 5 wt % of the starch-free baked food, for example 2 wt % to 5 wt %, or 3 wt % to 5 wt %, or 4 wt % to 5 wt %, or 1 wt % to 4 wt %, or 1 wt % to 3 wt %, or 1 wt % to 2 wt %, or 2 wt % to 3 wt %, or 3 wt % to 4 wt %, or 2 wt % to 4 wt %, or about 1 wt %, %, or about 2 wt %, or about 3 wt %, or about 4 wt %, or about 5 wt % of the starch-free baked food.

In embodiments, a fourth suitable bulking component is a phosphated starch, commonly referred to as "resistant starch". Resistant starch is a non-digestible polysaccharide. One exemplary but nonlimiting resistant starch is a phosphated wheat starch, CAS No. 977043-58-5. Resistant starch is suitably added to a starch-free batter in an amount of about 5 wt % to about 20 wt % of the total weight of the starch-free batter, for example 5 wt % to 18 wt %, or 5 wt % to 16 wt %, or 5 wt % to 14 wt %, or 5 wt % to 12 wt %, or 5 wt % to 10 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt % of the starch-free batter. In embodiments, the resistant starch is present in a starch-free baked food in an amount of about 5 wt % to about 25 wt % of the total weight of the starch-free baked food, for example 5 wt % to 25 wt %, 5 wt % to 20 wt %, 5 wt % to 18 wt %, or 5 wt % to 16 wt %, or 5 wt % to 14 wt %, or 5 wt % to 12 wt %, or 5 wt % to 10 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt %, or about 21 wt %, or about 22 wt %, or about 23 wt % or about 24 wt %, or about 25 wt % of the total weight of the starch-free baked food.

In embodiments the conditioner is a food compound that has a melting point of less than 20° C., has a boiling point in excess of 260° C., and is hygroscopic. In embodiments, the conditioner comprises, consists essentially of, or consists of glycerol (glycerin), a polyol having a reported melting point of 17.8° C. and a boiling point of 290° C. Without being limited by theory, we believe the conditioner operates during baking of the starch-free batter to provide a controlled level of water, in embodiments free water, within the starch-free composition during and/or after baking, and may also operate separately or together with water to increase the elasticity of the network formed by the protein isolate mixture together with the other components of the starch-free baked compositions. As such the conditioner contributes to formation and retention of a starch-free baked food matrix in the starch-free baked food formed from the starch-free batters.

In embodiments, the conditioner is added to a starch-free batter in an amount of about 5 wt % to about 15 wt % of the total weight of the starch-free batter, for example 5 wt % to 15 wt %, or 5 wt % to 14 wt %, or 5 wt % to 13 wt %, or 5 wt % to 12 wt %, or 5 wt % to 11 wt %, or 5 wt % to 10 wt %, or 5 wt % to 9 wt %, or 5 wt % to 8 wt %, or 5 wt % to 7 wt %, or 5 wt % to 6 wt %, or 6 wt % to 15 wt %, or 7 wt % to 15 wt %, or 8 wt % to 15 wt %, or 9 wt % to 15 wt %, or 10 wt % to 15 wt %, or 11 wt % to 15 wt %, or 12 wt % to 15 wt %, or 13 wt % to 15 wt %, or 14 wt % to 15 wt %, or or 6 wt % to 15 wt %, or 7 wt % to 15 wt %, or 8 wt % to 15 wt %, or 9 wt % to 15 wt %, or 10 wt % to 15 wt %, or 11 wt % to 15 wt %, or 12 wt % to 15 wt %, or 13 wt % to 15 wt %, or 14 wt % to 15 wt %, or 5 wt % to 7 wt %, or 7 wt % to 9 wt %, or 9 wt % to 11 wt %, or 11 wt % to 13 wt %, or 13 wt % to 15 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt % of the total weight of the starch-free batter. In embodiments, the conditioner is present in a starch-free baked food in an amount of about 5 wt % to about 20 wt % of the total weight of the starch-free baked food, for example 5 wt % to 20 wt %, 5 wt % to 18 wt %, or 5 wt % to 16 wt %, or 5 wt % to 14 wt %, or 5 wt % to 12 wt %, or 5 wt % to 10 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 18 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt % of the total weight of the starch-free baked food.

In embodiments, the emulsifier is a food compound that is associated with emulsification of one or more fat sources. Without being limited to theory, we believe the emulsifier assists in preventing or decreasing the separation of the fat source from the other components of the starch-free composition during and/or after baking, and operates to impart a uniform texture and even distribution of the fat source throughout the starch-free baked food. In embodiments, the emulsifier comprises, consists essentially of, or consists of a lecithin. In embodiments, the lecithin is a seed lecithin. In embodiments the lecithin is a sunflower lecithin. In embodiments, the lecithin is a soy lecithin. In embodiments, the lecithin is an egg lecithin. In embodiments, the lecithin is a milk lecithin. In embodiments, the lecithin is a wheat lecithin.

In embodiments, the emulsifier is added to a starch-free batter in an amount of about 0.1 wt % to about 2 wt % of the total weight of the starch-free batter, for example 0.2 wt % to 2 wt %, or 0.3 wt % to 2 wt %, or 0.4 wt % to 2 wt %, or 0.5 wt % to 2 wt %, or 0.6 wt % to 2 wt %, or 0.7 wt % to 2 wt %, or 0.8 wt % to 2 wt %, or 1 wt % to 2 wt %, or 0.2 wt % to 1 wt %, or 0.3 wt % to 1 wt %, or 0.4 wt % to 1 wt %, or 0.5 wt % to 1 wt %, or 0.6 wt % to 1 wt %, or 0.7 wt % to 1 wt %, or 0.8 wt % to 1 wt %, or 0.1 wt % to 0.3 wt %, or 0.3 wt % to 0.5 wt %, or 0.5 wt % to 0.7 wt %, or 0.7 wt % to 0.9 wt %, or about 0.1 wt %, or about 0.2 wt %, or about 0.3 wt %, or about 0.4 wt %, or about 0.5 wt %, or about 0.6 wt %, or about 0.7 wt %, or about 0.8 wt %, or about 0.9 wt %, or about 1 wt %, or about 1.1 wt %, or about 1.2 wt %, or about 1.3 wt %, or about 1.4 wt %, or about 1.5 wt %, or about 1.6 wt %, or about 1.7 wt %, or about 1.8 wt %, or about 1.9 wt %, or about 2 wt % of the total weight of the starch-free batter. In embodiments, the emulsifier is present in a starch-free baked food in an amount of about 0.1 wt % to about 2.5 wt % of the total weight of the starch-free food, for example 0.2 wt % to 2.5 wt %, or 0.5 wt % to 2.5 wt %, or 1.0 wt % to 2.5 wt %, or 1.5 wt % to 2.5 wt %, or 2.0 wt % to 2.5 wt %, or 1.0 wt % to 2 wt %, or 0.1 wt % to 0.5 wt %, or 0.5 wt % to 1.0 wt %, or 1.0 wt % to 1.5 wt %, or 1.5 wt % to 2.0 wt %, or 2.0 wt % to 2.5 wt %, or 0.2 wt % to 1 wt %, or 0.1 wt % to 0.3 wt %, or 0.3 wt % to 0.5 wt %, or 0.5 wt % to 0.7 wt %, or 0.7 wt % to 0.9 wt %, or 0.9 wt % to 1.1 wt %, or 1.1 wt % to 1.3 wt %, or 1.3 wt % to 1.5 wt %, or 1.5 wt %, to 1.7 wt %, or 1.7 wt % to 1.9 wt %, or 1.9 wt % to 2.1 wt %, or 2.1 wt % to 2.3 wt %, or 2.3 wt % to 2.5 wt %, or about 0.1 wt %, or about 0.2 wt %, or about 0.3 wt %, or about 0.4 wt %, or about 0.5 wt %, or about 0.6 wt %, or about 0.7 wt %, or about 0.8 wt %, or about 0.9 wt %, or about 1 wt %, or about 1.1 wt %, or about 1.2 wt %, or about 1.3 wt %, or about 1.4 wt %, or about 1.5 wt %, or about 1.6 wt %, or about 1.7 wt %, or about 1.8 wt %, or about 1.9 wt %, or about 2 wt %, or about 2.1 wt %, or about 2.2. wt %, or about 2.3 wt %, or about 2.4 wt %, or about 2.5 wt % of the total weight of the starch-free baked food.

In embodiments the thickener (or thickening agent) is a polymeric food compound that is associated with increasing the viscosity of water sources. In embodiments, the thickener comprises, consists essentially of, or consists of xanthan gum. Xanthan gum is a bacterially formed polysaccharide of glucose and sucrose. In other embodiments the thickening agent comprises, consists essentially of, or consists of guar gum, locust bean gum, psyllium husk, cellulose gum, carboxymethyl cellulose, methyl cellulose, gum acacia, or mixtures of any two or more such thickeners.

In embodiments, the thickener is added to a starch-free batter in an amount of about 0.1 wt % to about 2 wt % of the total weight of the starch-free batter, for example 0.2 wt % to 2 wt %, or 0.3 wt % to 2 wt %, or 0.4 wt % to 2 wt %, or 0.5 wt % to 2 wt %, or 0.6 wt % to 2 wt %, or 0.7 wt % to 2 wt %, or 0.8 wt % to 2 wt %, or 1 wt % to 2 wt %, or 0.2 wt % to 1 wt %, or 0.3 wt % to 1 wt %, or 0.4 wt % to 1 wt %, or 0.5 wt % to 1 wt %, or 0.6 wt % to 1 wt %, or 0.7 wt % to 1 wt %, or 0.8 wt % to 1 wt %, or 0.1 wt % to 0.3 wt %, or 0.3 wt % to 0.5 wt %, or 0.5 wt % to 0.7 wt %, or 0.7 wt % to 0.9 wt %, or about 0.1 wt %, or about 0.2 wt %, or about 0.3 wt %, or about 0.4 wt %, or about 0.5 wt %, or about 0.6 wt %, or about 0.7 wt %, or about 0.8 wt %, or about 0.9 wt %, or about 1 wt %, or about 1.2 wt %, or about 1.4 wt %, or about 1.6 wt %, or about 1.8 wt %, or about 2 wt % of the total weight of the starch-free batter. In embodiments, the thickener is present in a starch-free baked food in an amount of about 0.1 wt % to about 2.5 wt % of the total weight of the starch-free food, for example 0.2 wt % to 2.5 wt %, or 0.5 wt % to 2.5 wt %, or 1.0 wt % to 2.5 wt %, or 1.5 wt % to 2.5 wt %, or 2.0 wt % to 2.5 wt %, or 1.0 wt % to 2 wt %, or 0.1 wt % to 0.5 wt %, or 0.5 wt % to 1.0 wt %, or 1.0 wt % to 1.5 wt %, or 1.5 wt % to 2.0 wt %, or 2.0 wt % to 2.5 wt %, or 0.2 wt % to 1 wt %, or 0.1 wt % to 0.3 wt %, or 0.3 wt % to 0.5 wt %, or 0.5 wt % to 0.7 wt %, or 0.7 wt % to 0.9 wt %, or 0.9 wt % to 1.1 wt %, or 1.1 wt % to 1.3 wt %, or 1.3 wt % to 1.5 wt %, or 1.5 wt %. to 1.7 wt %, or 1.7 wt % to 1.9 wt %, or 1.9 wt % to 2.1 wt %, or 2.1 wt % to 2.3 wt %, or 2.3 wt % to 2.5 wt %, or about 0.1 wt %, or about 0.2 wt %, or about 0.3 wt %, or about 0.4 wt %, or about 0.5 wt %, or about 0.6 wt %, or about 0.7 wt %, or about 0.8 wt %, or about 0.9 wt %, or about 1 wt %, or about 1.1 wt %, or about 1.2 wt %, or about 1.3 wt %, or about 1.4 wt %, or about 1.5 wt %, or about 1.6 wt %, or about 1.7 wt %, or about 1.8 wt %, or about 1.9 wt %, or about 2 wt %, or about 2.1 wt %, or about 2.2. wt %, or about 2.3 wt %, or about 2.4 wt %, or about 2.5 wt % of the total weight of the starch-free baked food.

In embodiments the glaciation agent is a food compound having a melt temperature of between 100° C. and 150° C. In embodiments, the glaciation agent is not a polymeric compound. In embodiments the glaciation agent is a sugar alcohol. In embodiments the sugar alcohol is erythritol, which has a melting point of about 120° C. Without being limited by theory, we believe the glaciation agent provides a liquid phase during baking of the starch-free composition, then reaches its melting temperature soon after the heat from baking is removed, that is, while the starch-free baked food is cooling; wherein the solidified glaciation agent increases the rigidity of the starch-free composition during the cooling, which in turn operates to support and maintain a starch-free baked food matrix in the starch-free baked food.

In embodiments, the glaciation agent is added to a starch-free batter in an amount of about 5 wt % to about 25 wt % of the total weight of the starch-free batter, for example 5 wt % to 25 wt %, or 5 wt % to 24 wt %, or 5 wt % to 22 wt %, or 5 wt % to 20 wt %, or 5 wt % to 18 wt %, or 5 wt % to 16 wt %, or 5 wt % to 14 wt %, or 5 wt % to 12 wt %, or 5 wt % to 10 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or 19 wt % to 21 wt %, or 21 wt % to 23 wt %, or 23 wt % to 25 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt %, or about 21 wt %, or about 22 wt %, or about 23 wt %, or about 24 wt %, or about 25 wt % of the total weight of the starch-free batter. In embodiments, the glaciation agent is present in a starch-free baked food in an amount of about 5 wt % to about 25 wt % of the total weight of the starch-free baked food, for example 5 wt % to 25 wt %, or 5 wt % to 24 wt %, or 5 wt % to 22 wt %, or 5 wt % to 20 wt %, or 5 wt % to 18 wt %, or 5 wt % to 16 wt %, or 5 wt % to 14 wt %, or 5 wt % to 12 wt %, or 5 wt % to 10 wt %, or 5 wt % to 8 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 18 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or 19 wt % to 21 wt %, or 21 wt % to 23 wt %, or 23 wt % to 25 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt %, or about 21 wt %, or about 22 wt %, or about 23 wt % or about 24 wt %, or about 25 wt % of the total weight of the starch-free baked food.

In embodiments the water source is fresh water, tap water, distilled water, or water subjected to purification by reverse osmosis. Such water sources may be referred to herein as "water", or "liquid water". The water source is added to a starch-free batter in an amount sufficient to provide mobility of the remaining components as a slurry. The slurry operates to facilitate intimate mixing of the three protein isolates with the bulking agent, the conditioner, the emulsifier, the thickening agent, and the glaciation agent, along with any additional components optionally added including but not limited to sweeteners, salt, flavorings, preservatives, and sources of $CO_2$ gas such a sodium bicarbonate or citric acid.

In embodiments, the amount of the water source added to the starch-free batter is selected to provide ease of mixing and completeness of mixing of the other components of the starch-free batter, further as selected by the user. Additionally, the amount of the water source combined with the other components of the starch-free batter results in a characteristic amount of free water in the starch-free baked food that results from baking the starch-free batter. "Free water" in the context of the starch-free baked foods herein means liquid water that is not chemically bound or adsorbed to another compound or associated as water of hydration. The amount of free water in a baked food may be suitably measured using hygrometer devices well known to those of ordinary skill in the art, including Resistive Electrolytic Hygrometers (REH), Capacitance Hygrometers, and Dew Point Hygrometers. We have found that the amount of a water source added to a starch-free batter results in a characteristic percentage of free water remaining in the starch-free baked food that is reproducible and can be predicted prior to baking. Accordingly, we have found that the starch-free baked foods disclosed herein include a controlled amount of free water that is reproducible and can be predicted based on the amount of the water source added to a starch-free batter having the components recited above, in the amounts recited above.

Thus, in embodiments, a starch-free batter includes about 5 wt % to about 25 wt % of a water source based on the total weight of the starch-free batter, for example 5 wt % to 25 wt %, or 5 wt % to 24 wt %, or 5 wt % to 22 wt %, or 5 wt % to 20 wt %, or 5 wt % to 18 wt %, or 5 wt % to 16 wt %, or 5 wt % to 14 wt %, or 5 wt % to 12 wt %, or 5 wt % to 10 wt %, or 5 wt % to 8 wt %, or 6 wt % to 20 wt %, or 8 wt % to 20 wt %, or 10 wt % to 20 wt %, or 12 wt % to 20 wt %, or 14 wt % to 20 wt %, or 16 wt % to 20 wt %, or 18 wt % to 20 wt %, or 5 wt % to 7 wt %, or 7 wt % to 9 wt %, or 9 wt % to 11 wt %, or 11 wt % to 13 wt %, or 13 wt % to 15 wt %, or 15 wt % to 17 wt %, or 17 wt % to 19 wt %, or 19 wt % to 21 wt %, or 21 wt % to 23 wt %, or 23 wt % to 25 wt %, or about 5 wt %, or about 6 wt %, or about 7 wt %, or about 8 wt %, or about 9 wt %, or about 10 wt %, or about 11 wt %, or about 12 wt %, or about 13 wt % or about 14 wt %, or about 15 wt %, or about 16 wt %, or about 17 wt %, or about 18 wt %, or about 19 wt %, or about 20 wt %, or about 21 wt %, or about 22 wt %, or about 23 wt % or about 24 wt %, or about 25 wt % of the total weight of the starch-free batter.

The amount of free water in the resulting starch-free baked food, that is, after heating the starch-free batter at a time and temperature to result in the formation of a starch-free baked food from the starch-free batter; and further after allowing the starch-free baked food to cool to about 23° C. or below, is determined by hygrometric methods. In embodiments, the amount of free water in a starch-free baked food is a fraction of the amount of the water source added to the starch-free batter, for example about ⅒th to ¹⁄₁₀₀th of the amount of the water source added to the starch-free batter used to form the starch-free baked food. In embodiments, the amount of free water in a starch-free baked food is about 0.50 wt % to about 1.00 wt % of the starch-free baked food, for example 0.50 wt % to 1.00 wt %, or 0.60 wt % to 1.00 wt %, or 0.70 wt % to 1.00 wt %, or 0.80 wt % to 1.00 wt %, or 0.90 wt % to 1.00 wt %, or 0.50 wt % to 0.90 wt %, or 0.50 to 0.80 wt %, or 0.50 to 0.70 wt %, or 0.50 wt % to 0.60 wt %, or 0.60 wt % to 0.70 wt %, or 0.70 wt % to 0.80 wt %, or 0.8 wt % to 0.9 wt %, or 0.9 wt % to 1.00 wt %, or about 0.50 wt %, or about 0.60 wt %, or about 0.70 wt %, or about 0.80 wt %, or about 0.90 wt %, or about 1.00 wt % of the weight of the starch-free baked food.

Advantageously, we have found that controlling the amount of liquid water added to a starch-free batter by careful selection operates to result in a starch-free baked food having a controlled percentage of free water present within the starch-free baked food matrix, when all of the starch-free batter components and amounts of the components, other than the water source, are the same. In embodiments, by selecting an amount of free water in the starch-free baked food, a selected baked food matrix texture is obtained. That is, the perceived texture of a starch-free baked good may be suitably controlled by changing the amount of the water source added to the starch-free batter. We have further found that the amount of free water in a starch-free baked food strongly affects the perceived starch-free baked food matrix qualities and in embodiments is determinative of the perceived starch-free baked food matrix qualities.

Thus, in one exemplary but non-limiting embodiment, a first starch-free batter having 20 wt % water will result in a first starch-free baked food having a first baked food matrix with an associated texture that may be described as "muffin-like"—that is, soft, spongy, or delicate with a plurality of air pockets defined by the combination of the protein isolate mixture together with one or more other components of the starch-free baked food. In another exemplary but non-limiting embodiment, a second starch-free batter that is the same as the first starch-free batter, except that the second starch-free batter includes only 10 wt % water, will result in a second starch-free baked food having a baked food matrix with an associated texture that may be described as "chewy" or "cookie-like"—that is stiffer, chewier, and/or more robust than the muffin-like baked food matrix.

Similarly, in embodiments, by changing the amount of the water source added to a starch-free batter, the starch-free batter is made to be suitable for forming starch-free baked foods having the perceived baked food matrix textural qualities ranging between the recognizable textures of doughnuts, muffins, brownies, soft cookies, cakes, or dessert bars, for example. The perceived baked food matrix qualities of the starch-free baked goods are suitably combined with sweeteners and other additional components as recited above to provide starch-free baked foods having superior organoleptic qualities in addition to desirable texture.

An important yet often unacknowledged part of the textural experience of consuming a baked food is the presence of air pockets defined by the baked food matrix. Such air pockets are also present and characteristic of the starch-free baked foods described herein. Thus, in embodiments, heated gas (steam, air, $CO_2$, or a combination thereof) expands or forms inside the starch-free batter during heating (baking), causing the proteins in the protein mixture to combine with the other components of the starch-free batter to stretch and form a matrix surrounding discrete or interconnected pockets of the gas. Upon cooling the resulting starch-free baked food, we have found that this interconnected baked food matrix persists. The starch-free baked foods described herein are thus characterized by a baked food matrix that surrounds and defines a plurality of discrete or interconnected pockets of gas, characterized in some embodiments as a cellular structure. The cellular structure of the starch-free baked food matrix is an unexpected and highly desirable property associated with and characteristic of the starch-free baked foods described herein.

Figure 2:
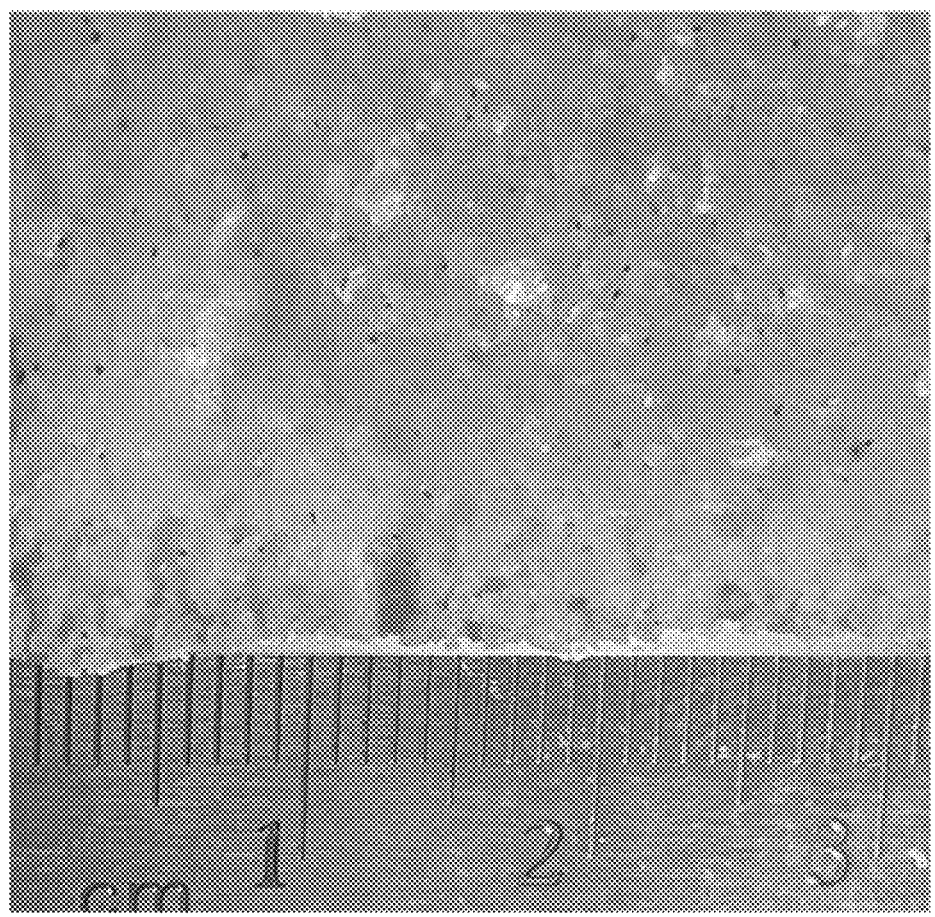
FIG. 2 is a photographic image of a backlit slice of the starch-free baked muffin of Example 10.

Images of exemplary but nonlimiting (cooled) starch-free baked foods as described herein are shown in FIGS. 1 and 2. FIG. 1 shows a series of baked muffin-type foods. The row of four muffins labeled Example 10 in FIG. 1 are exemplary of the starch free baked foods described herein. The appearance of the muffins of Example 10 is commensurate with the expected appearance and texture of a bakery muffin.

One of the muffins labeled Example 10 in FIG. 1 was cut into thin (about 1 mm) slices for further observation. FIG. 2 is a photographic image showing one of the slices of the muffin of Example 10, placed on a lightbox for viewing images and backlit using the lightbox. In FIG. 2, a plurality of discrete or interconnected pockets of gas can be observed as surrounded by a baked food matrix formed in accordance with Example 10 below. Such a baked food matrix is highly desirable for imparting the experience and satisfying mouthfeel of eating a conventional baked food. We have found that a plurality of discrete or interconnected pockets of gas surrounded by a baked food matrix is a characteristic feature of the starch-free baked foods described herein. Further, the ability to form the characteristic air-pocketed starch-free baked food matrix is attributed to the protein mixture, and the ratio of the three protein components of the protein mixture. In that sense, the Experimental data included herein show this surprising and unexpected effect of the protein mixture, since other mixtures and other ratios of protein components were inferior in forming an air-pocketed starch-free baked food matrix, or in embodiments completely failed to form such a matrix; and thus did not result in starch-free baked foods having desirable textural or organoleptic qualities.

The protein mixtures disclosed above, combined with the other starch-free batter components, enable the formation of a starch-free baked food with superior texture, evidenced by appearance of air pockets or bubble-like structures in the interior thereof; and textural and organoleptic properties that are similar to or in some embodiments the same as a traditional baked good. Thus, in embodiments, a starch-free batter comprising, consisting essentially of, or consisting of the protein mixture having the three different protein components is mixed with the water source, the fat source, the bulking agent, the conditioning agent, the emulsifier, the thickening agent, and the glaciation agent, along with one or more optional additional components, and the starch-free batter is baked to result in a starch-free baked food that has and textural and organoleptic properties that are similar to or in some embodiments the same as a traditional baked food, even indistinguishable from a traditional baked food containing starch.

Thus, in embodiments, during the baking (heating) of a starch-free batter, hot gases inside the starch-free batter stretch the protein mixture along with one or more of the polymeric components of the starch-free batter, eventually leading to a baked food having a cellular structure: that is, a plurality of discrete and/or interconnected gas (air) pockets distributed within a fibrous infrastructure throughout the entirety of the starch-free baked food. The fat source and the conditioner as well as the water source contribute to the elasticity of the network and increase its ability to entrain gases. The quantity of each of the specific components of the starch-free batter determine the final form and characteristics of a cooled starch-free baked food matrix. These characteristics, together with the size and distribution of air pockets or bubbles entrained by the starch-free baked food matrix, results in a starch-free baked food having a observed or perceived texture that varies from soft and/or spongy to crisp and/or crumbly when consumed.

Without being limited by theory, we believe that the protein mixture of three protein components, which have distinct and different solubility in water, particle size in water, or both solubility and particle size in water, enable the formation of the observed starch-free baked food matrix described above, and leads to the starch-free baked foods having the unexpectedly superior qualities discussed in detail above, including the textural and organoleptic qualities and cellular structure of the starch-free baked foods. The combination of three different size materials is known on a macroscopic scale to produce a combined structure that naturally resists compression. Thus, for example, Lindell, U.S. Pat. No. 7,461,424 discloses that encasing a combination of foam pieces having a first plurality of foam pieces selected to have a first average size, a second plurality of foam pieces selected to have a second average size that is larger than the first average size, and a third plurality of foam pieces selected to have a third average size that is larger than the second average size results in a pillow configuration having improved cushioning properties. The interrelationship of the three differently sized foam pieces tend to form an interlocking structure that resists compression. Similarly, we believe that the protein mixture of three protein components, which have distinct and different solubilities in water and/or particle sizes in water, may produce a similar effect of interlocking before and/or during baking of the starch-free batters described herein, providing support for the observed starch-free baked food matrix having superior textural and organoleptic properties, further comprising a cellular structure that is supported by an interlocked protein network or structure imparted by the protein mixture.

These features of the starch-free baked foods described herein, combined with the controlled amount of free water therein, contribute to a starch-free baked food having an unexpectedly long shelf life compared to conventional baked foods. Since there is 1 wt % or less starch content, in some embodiments no starch, and in some embodiments no digestible polysaccharides in the starch-free baked foods, bacterial growth and other aging issues surrounding starch and other digestible polysaccharides is not enabled or is retarded in the starch-free baked foods in comparison to traditional baked foods containing starch. Accordingly, in embodiments, the starch-free baked foods described herein obtain a shelf life of at least about 6 months and as long as about 24 months, for example 8 months to 24 months, 10 months to 24 months, or 12 months to 24 months when sealed in a film or other storage container and stored at 30° C. or less.

The following experimental data provides additional representative but non-limiting embodiments of the foregoing starch-free baked compositions and features thereof.

EXPERIMENTAL SECTION

Examples 1-10

To target a starch-free baked muffin product, a series of batters was mixed using the list of components and amounts found in Table 1, where 16.72% total of a protein mixture was added to each batter. The type and amount of the protein components for each of Examples 1-10 are listed in Table 2, wherein Protein Component 1 is HILLMAR™ 9000 Whey Protein Isolate, from Hillmar Ingredients of Hillmar, Calif.; Protein Component 2 is NZMP™ SUREPROTEIN™ Calcium Caseinate 380, from Fonterra Co-operative Group Ltd. of New Zealand; and Protein Component 3 is Micellar Casein PIN 100917, from Milk Specialties Global of Eden Prairie, Minn.

Referring to Table 1, components listed as having Mixing Order 1 were combined in a stainless steel mixing bowl and mixed for two minutes using a stand mixer with a paddle attachment. Then the components listed as having Mixing Order 2 were added to the mixing bowl, and the contents were mixed for two minutes. Finally, the components listed as having Mixing Order 3 were added to the mixing bowl, and the contents were mixed for two minutes to result in a batter. Then pH of the batter was measured. All batters had a pH between 7 and 8. The batters were divided by pouring or scooping into muffin tins and baking the batter within the tins by placing in an oven set to 149° C. for 30 minutes. Baked products were observed to form during the baking. After the 30 minutes of baking, the baked products were removed from the oven and allowed to cool to ambient temperature. Then each baked product was analyzed for water activity (free water) using a Dew Point Hygrometer, and further analyzed for finished appearance, flavor, and texture as reported in Table 2.

TABLE 1

Starch-free batter components of Examples 1-10. Weight percent is expressed as weight percent solids, except for water.

| Batter Component | Mixing Order | Source | Weight % of Batter |
|---|---|---|---|
| Protein Components, total | 3 | (see above and Table 2) | 19.76 |
| Water | 2 | Tap water plus water added as part of other components (protein isolates and polydextrose) | 17.95 |
| Fat source | 2 | Hi Oleic Sunflower Oil 018058 (from Capitol Food Co. of Cerritos, CA) | 16.46 |
| First bulking component | 2 | LITESSE ® Ultra 70% Solution Polydextrose Drum 8105201 (from Danisco USA Inc. of New Century, KS) | 8.19 |
| Conditioning agent | 2 | Glycerol 365264ESR (from ADM ® of Chicago, IL) | 12.10 |
| Emulsifier | 2 | Sunrise SFL Sunflower Lecithin Liquid (from AAK AB of Malmö, Sweden) | 0.58 |
| Thickening agent | 1 | FUFENG ® 200 xanthan gum (from Fufeng Group of China) | 0.22 |
| Glaciation agent | 2 | Erythritol Powder 50.50.250 (from Nutra Food Ingredients, LLC of Kentwood, MI) | 9.30 |
| Second bulking component | 3 | VITACEL ® L601 FCC (J Rettenmaier USA LP of Schoolcraft, MI) | 2.80 |
| Third bulking component | 3 | Almond meal | 8.98 |
| Additional components | 2, 3 | Vanilla, salt, natural flavors, sucralose, preservatives, sodium bicarbonate | 3.66 |

TABLE 2

Weight percent of the protein mixture, mixed with the batters of Table 1, and resulting free water and observations regarding the starch-free baked foods of Examples 1-10, further in reference to FIG. 1.

| Example | Protein Component 1, wt % of batter | Protein Component 2, wt % of batter | Protein Component 3, wt % of batter | Free water, wt % of baked food | Observations (also see FIG. 1) |
|---|---|---|---|---|---|
| 1 |  | 16.72% |  | 0.69 | Complete collapse of baked product. Very chewy texture and flavor was observed to have notes of sour milk, cooked milk or dairy off-note, and cardboard-like flavors. Batter was thick like a dough during mixing. |
| 2 | 16.72% |  |  | 0.68 | Acceptable height and appearance of the baked product. Crumb was tight, with an internal bread-like appearance, and very dry mouthfeel and texture. |
| 3 |  |  | 16.72% | 0.69 | Collapse of baked product during cooling. Moist mouthfeel but texture like raw dough. Flavor was observed to have notes of sour milk, cooked milk or dairy off-note, and cardboard-like flavors. Batter was thick like a dough during mixing. |
| 4 | 8.36% | 8.36% |  | 0.69 | Acceptable height and appearance of the baked product. Moist mouthfeel, but flavor was observed to have notes of sour milk, cooked milk or dairy off-note, and cardboard-like flavors. Texture was observed to be grainy. |
| 5 | 8.36% |  | 8.36% | 0.69 | Acceptable height and appearance of the baked product. Moist mouthfeel, but flavor was observed to have notes of sour milk, cooked milk or dairy off-note, and cardboard-like flavors. A very open cell structure was observed. Texture was observed to be grainy. |
| 6 |  | 8.36% | 8.36% | 0.70 | Collapse of baked product during cooling. Moist mouthfeel but texture like raw dough with multiple off-flavors. Batter was thick like a dough during mixing. |
| 7 | 5.57% | 5.57% | 5.57% | 0.70 | Collapse of baked product during cooling. Texture and mouthfeel were moist and chewy. Flavor was sweet with cinnamon, blueberry notes. |
| 8 | 11.4% | 2.67% | 2.67% | 0.69 | Volume and appearance was acceptable. Texture was acceptable with a just a slightly more granular mouthfeel as compared to Example 10. Flavor was sweet with cinnamon, blueberry notes. |
| 9 | 11.4% | 2.0% | 3.3% | 0.70 | Volume and appearance was acceptable. Similar to Example 10, with moist mouthfeel, smooth texture (no graininess), pleasant chewing experience and even breakdown of product in the mouth. Flavor was sweet with cinnamon, blueberry notes. |
| 10 | 11.4% | 3.8% | 1.5% | 0.68 | Volume and appearance was acceptable. Moist mouthfeel, smooth texture that is not too dry or too grainy, breaks down evenly in the mouth during chewing and has a sweet, slight warm cinnamon flavor with a hint of blueberry flavor undertones. |

In accordance with the observations of Table 2, a photograph showing four muffin products that resulted from each of the batters according to Examples 1-10 is shown in FIG. 1. As shown in FIG. 1, the muffins of Example 10 having an exemplary protein mixture produces a starch-free baked food having desirable appearance and texture, whereas omitting one of the three protein components while providing the same total amount of protein (obtained from the total of two of the three protein components), as in Examples 4, 5, and 6, produces a starch-free batter that fails to result in a desirable starch-free baked food. Additionally, changing the ratio of the three protein components while providing the same total amount of protein, as in Example 7, leads to formation of a starch-free batter that fails to result in a desirable starch-free baked food.

Example 11

The three protein components of Examples 1-10 were analyzed to determine particle size in a dilute solution, dispersion, or suspension in deionized water. Protein Component 1 is HILLMAR™ 9000 Whey Protein Isolate, from Hillmar Ingredients of Hillmar, Calif.; Protein Component 2 is NZMP™ SUREPROTEIN™ Calcium Caseinate 380, from Fonterra Co-operative Group Ltd. of New Zealand; and Protein Component 3 is Micellar Casein PIN 100917, from Milk Specialties Global of Eden Prairie, Minn.

Particle size analysis was conducted using a Horiba LA-950 laser scattering particle size analyzer, employing a combination of Fraunhaufer and Mie light scattering theory to analyze the size distribution of solid and liquid particles.

The samples were pre-dispersed in deionized water prior to analysis by introducing 3 g of sample into 15 mL of deionized water in a vial. The vial was vortexed for 15 seconds to thoroughly mix the contents. The analyzer was filled with water, aligned, blanked, and the pre-dispersed sample was introduced directly into the analyzer until a transmission level of ~85% was achieved. The sample circulated in the analyzer for 30 seconds prior to acquisition of the measurement. Results of the particle size analyses are shown in Table 3.

TABLE 3

Mean particle size, and D10, D50 (median particle size), and D90 for Protein Components 1, 2, and 3, in microns.

| Protein Component | Mean | D10 | D50 (median) | D90 |
|---|---|---|---|---|
| Protein Component 2 | 50.0 | 15.8 | 42.4 | 91.2 |
| Protein Component 1 | 20.9 | 9.73 | 18.9 | 33.8 |
| Protein Component 3 | 57.9 | 13.5 | 45.6 | 119 |

Example 12

A cake-like bar or cookie was formulated using the procedure of Examples 1-10 with the batter components shown in Table 4, wherein Protein Component 1 is HILLMAR™ 9000 Whey Protein Isolate, from Hillmar Ingredients of Hillmar, Calif.; Protein Component 2 is NZMP™ SUREPROTEIN™ Calcium Caseinate 380, from Fonterra Co-operative Group Ltd. of New Zealand; and Protein Component 3 is Micellar Casein PIN 100917, from Milk Specialties Global of Eden Prairie, Minn.

TABLE 4

Batter components of the baked food of Example 12, in wt % of batter.

| Batter Component | Mixing Order | Source | Weight % of Batter |
|---|---|---|---|
| Protein Component 1 | 3 | HILLMAR ™ 9000 Whey Protein Isolate, from Hillmar Ingredients of Hillmar, California | 10.81% |
| Protein Component 2 | 3 | NZMP ™ SUREPROTEIN ™ Calcium Caseinate 380, from Fonterra Co-operative Group Ltd. of New Zealand | 3.77% |
| Protein Component 3 | 3 | Micellar Casein PIN 100917, from Milk Specialties Global of Eden Prairie, Minnesota | 1.47% |
| Water source | 2 | Tap water plus water added as part of other components (protein isolates and polydextrose) | 11.42% |
| Fat source | 2 | Hi Oleic Sunflower Oil 018058 (from Capitol Food Co. of Cerritos, CA) | 18.81% |
| First Bulking Component | 2 | LITESSE ® Ultra 70% Solution Polydextrose Drum 8105201 (from Danisco USA Inc. of New Century, KS) | 9.40% |
| Conditioning agent | 2 | Glycerol 365264ESR (from ADM ® of Chicago, IL) | 10.22% |
| Emulsifier | 2 | Sunrise SFL Sunflower Lecithin Liquid (from AAK AB of Malmö, Sweden) | 0.93% |
| Thickening agent | 1 | FUFENG ® 200 xanthan gum (from Fufeng Group of China) | 0.66% |
| Glaciation agent | 2 | Erythritol Powder 50.50.250 (from Nutra Food Ingredients, LLC of Kentwood, MI) | 14.14% |
| Second Bulking Component | 3 | VITACEL ® L601 FCC (J Rettenmaier USA LP of Schoolcraft, MI) | 3.77% |
| Third Bulking Component | 3 | Almond meal | 12.19% |
| Additional components | 1, 2 | Vanilla, salt, natural flavors, sucralose, preservatives, sodium bicarbonate | 2.42% |

After baking and cooling, the baked food was tested and found to have good height and appearance with no sign of collapse, a moist, velvety texture, and excellent flavor associated with "birthday cake" flavor. Free water in the baked food was measured using a Dew Point Hygrometer, and found to be 0.682 wt % (aW).

Example 13

A batch of 70 starch-free soft cookies of about 25 g apiece and having a round shape with dimensions of about 2 inches diameter and about 0.87 inches tall at center were baked using starch-free batters with components and amounts similar to the starch-free batter of Example 12 and Table 3, but with different "Additional components" (as shown in Table 3) to impart a chocolate flavor. An initial inspection and taste test revealed a cake-like texture and organoleptic experience commensurate with conventional chocolate cake. The batch was split into 7 (seven) groups of 10 cake bites each. Each cake bite was sealed inside a flexible package formed from 34E210Y01P multilayer polypropylene film sold by CP Flexible Packaging of Lakeville, Minn. The film has a moisture vapor transmission rate of 0.030 g/100 in$^2$/24 hr or less at 38° C. and 90% RH; and an oxygen transmission rate of 6.000 cc/100 in$^2$/24 hr or less at 23° C. and 0% RH.

The sealed cake bites were stored at 30° C. in an environmental chamber.

After one month, 10 (ten) soft cookies were removed from 30° C. storage and unsealed, inspected, and tasted. The unsealing, inspection, and tasting was repeated once every month for 10 months. In each instance, the inspection and tasting revealed that the soft cookies did not deteriorate in terms of flavor, texture, or appearance from the initial tasting; and in each sampling were found to have pleasant, fresh flavor without off-flavors or stale texture of mouthfeel. The test is continuing at the time of this writing.

Example 14

A muffin batter was formulated and baked using the procedure of Examples 1-10 and the batter components as shown in Table 5.

TABLE 5

Batter components of the baked food of Example 14, in wt % of batter.

| Batter Component | Mixing Order | Source | Weight % of Batter |
|---|---|---|---|
| Protein Component 1 | 3 | HILLMAR ™ 9000 Whey Protein Isolate, from Hillmar Ingredients of Hillmar, California | 11.84% |

TABLE 5-continued

Batter components of the baked food of Example 14, in wt % of batter.

| Batter Component | Mixing Order | Source | Weight % of Batter |
|---|---|---|---|
| Protein Component 2 | 3 | NZMP ™ SUREPROTEIN ™ Calcium Caseinate 380, from Fonterra Co-operative Group Ltd. of New Zealand | 2.08% |
| Protein Component 3 | 3 | Micellar Casein PIN 100917, from Milk Specialties Global of Eden Prairie, Minnesota | 3.43% |
| Water source | 2 | Tap water plus water added as part of other components (protein components and polydextrose) | 11.83% |
| Fat source | 2 | Hi Oleic Sunflower Oil 018058 (from Capitol Food Co. of Cerritos, CA) | 19.48% |
| First Bulking Component | 2 | LITESSE ® Ultra 70% Solution Polydextrose Drum 8105201 (from Danisco USA Inc. of New Century, KS) | 9.74% |
| Conditioning agent | 2 | Glycerol 365264ESR (from ADM ® of Chicago, IL) | 10.58% |
| Emulsifier | 2 | Sunrise SFL Sunflower Lecithin Liquid (from AAK AB of Malmö, Sweden) | 0.97% |
| Thickening agent | 1 | FUFENG ® 200 xanthan gum (from Fufeng Group of China) | 0.69% |
| Glaciation agent | 2 | Erythritol Powder 50.50.250 (from Nutra Food Ingredients, LLC of Kentwood, MI) | 14.64% |
| Second Bulking Component | 3 | FIBERSYM ® RW RS4 resistant wheat starch (from MGP ® Ingredients of Atchinson, KS) | 12.23% |
| Additional components | 1, 2 | Vanilla, salt, natural flavors, sucralose, preservatives, sodium bicarbonate | 2.50% |

The muffin was observed to have an appearance similar to the muffin of Example 10, with excellent height and a lighter appearing crumb than the muffin of Example 10. The muffin had a moist mouthfeel with a slightly grainy texture. The muffin was chewier than those of Examples 8-10. There was a sour flavor at the end that overtook the cinnamon and sweet notes.

What is claimed is:

1. A starch-free batter comprising a mixture of:
a protein mixture consisting of a first protein component having a soluble solids index of >90% and a mean particle size of about 10 µm to about 30 µm in deionized water, as determined by light scattering analysis; a second protein component having a soluble solids index of >50% to 90% and a mean particle size of about 40 µm to about 55 µm in deionized water, as determined by light scattering analysis; and a third protein component having a soluble solids index of ≤50% and a mean particle size of about 50 µm to about 75 µm in deionized water, as determined by light scattering analysis, wherein the protein components are present in the protein mixture at a ratio of about 10 to 13 parts by weight of the first protein component, to about 3 to 5 parts by weight of the second protein component, to about 1 to 4 parts by weight of the third protein component;
a fat source;
a bulking agent;
a conditioner comprising glycerin;
an emulsifier;
a thickening agent;
a glaciation agent comprising a sugar alcohol; and
about 5 wt % to 25 wt % of a water source.

2. The starch-free batter of claim 1 wherein the protein mixture is about 15 wt % to about 25 wt % of the starch-free batter.

3. The starch-free batter of claim 1 wherein the first protein component, the second protein component, and the third protein component are all obtained from a single protein source.

4. The starch-free batter of claim 3 wherein the single protein source is cow's milk, the first protein component is a whey protein isolate, and the second and third protein components are caseins.

5. The starch-free batter of claim 1 wherein the protein components are present in the protein mixture at a ratio of about 10.5 to 12.0 parts by weight of the first protein component, to about 3.5 to 4.0 parts by weight of the second protein component, to about 1.0 to 2.0 parts by weight of the third protein component.

6. The starch-free batter of claim 1 wherein the protein mixture is about 15 wt % to about 25 wt % of the starch-free batter, the fat source is about 5 wt % to about 30 wt % of the starch-free batter, the bulking agent is about 10 wt % to about 30 wt % of the starch-free batter, the conditioner is about 5 wt % to about 15 wt % of the starch-free batter, the emulsifier is about 0.1 wt % to about 2 wt % of the starch-free batter, the thickener is about 0.1 wt % to about 2 wt % of the starch-free batter, and the glaciation agent is about 5 wt % to about 25 wt % of the starch-free batter.

7. The starch-free batter of claim 1 wherein the bulking agent comprises a polydextrose, a resistant starch, an insoluble fiber, or a combination thereof.

8. The starch-free batter of claim 1 wherein the conditioner is glycerin; the emulsifier is a lecithin; the thickening agent is a xanthan gum; and the glaciation agent is erythritol.

9. The starch-free batter of claim 1 further including one or more optional additional components selected from sweeteners, salt, flavorings, spices, waxes, preservatives, and $CO_2$ gas sources.

10. A starch-free baked food formed by baking the starch-free batter of claim 1 at a temperature between 90° C. and 260° C. for an amount of time sufficient to form a starch-free baked food; and allowing the starch-free baked food to cool to 23° C. or less, wherein the cooled starch-free baked food comprises about 0.50 wt % to 1.00 wt % free water.

11. The starch-free baked food of claim 10 wherein the bulking agent comprises polydextrose, resistant starch, or a combination thereof.

12. The starch-free baked food of claim 10 wherein the conditioner is glycerin, the emulsifier is a lecithin, the thickening agent is a xanthan gum, and the glaciation agent is erythritol.

13. The starch-free baked food of claim 10 further including one or more optional additional components selected from sweeteners; salt; flavorings; spices; waxes; and preservatives.

14. The starch-free baked food of claim 10 wherein the protein mixture is about 15 wt % to about 30 wt % of the starch-free baked food, the fat source is about 5 wt % to about 40 wt % of the starch-free baked food, the bulking agent is about 10 wt % to about 35 wt % of the starch-free baked food, the conditioner is about 5 wt % to about 20 wt % of the starch-free baked food, the emulsifier is about 0.1 wt % to about 2.5 wt % of the starch-free baked food, the thickener is about 0.1 wt % to about 2.5 wt % of the starch-free baked food, and the glaciation agent is about 5 wt % to about 25 wt % of the starch-free baked food.

15. A method of making a starch-free baked food, the method comprising baking the starch-free batter of claim 1 at a temperature between 90° C. and 260° C. to form a starch-free baked food; and cooling the starch-free baked food to 23° C. or less, wherein the amount of free water in the cooled starch-free baked food is about 0.50 wt % to 1.00 wt %.

16. The method of claim 15 wherein the protein components are present in the starch-free baked food in a ratio of about 10.5 to 12.0 parts by weight of the first protein component, to about 3.5 to 4.0 parts by weight of the second protein component, to about 1.0 to 2.0 parts by weight of the third protein component.

17. The method of claim 15 further comprising storing the starch-free baked food for a period of 6 months to 24 months.

18. The starch-free batter of claim 3 wherein the single protein source is selected from soybeans, cow's milk, or chicken eggs.

* * * * *